US006631302B1

(12) United States Patent
Wilson

(10) Patent No.: US 6,631,302 B1
(45) Date of Patent: Oct. 7, 2003

(54) SYSTEM AND METHOD FOR ALIGNING COMPONENTS OF OPTICAL HEAD

(75) Inventor: Scott D. Wilson, Westminster, CO (US)

(73) Assignee: DPHI Acquisitions, Inc., Boulder, CO (US)

(*) Notice: Subject to any disclaimer, the term of this patent is extended or adjusted under 35 U.S.C. 154(b) by 0 days.

(21) Appl. No.: 09/544,370

(22) Filed: Apr. 6, 2000

(51) Int. Cl.[7] .............................................. G05B 19/18
(52) U.S. Cl. ............................ 700/59; 700/57; 700/58; 385/14; 369/44.23; 369/44.12; 369/44.16; 369/112.01
(58) Field of Search ...................... 700/57–59; 385/14; 369/44.23, 44.12, 44.16, 112.01

(56) References Cited

U.S. PATENT DOCUMENTS

| | | | | |
|---|---|---|---|---|
| 5,063,645 A | * | 11/1991 | Crespo ........................ 24/501 |
| 5,152,055 A | | 10/1992 | L'Esperance, III et al. ... 29/834 |
| 5,159,361 A | * | 10/1992 | Cambier et al. ............ 351/212 |
| 5,410,532 A | * | 4/1995 | Ono et al. ............. 369/112.16 |
| 5,432,763 A | * | 7/1995 | Campbell et al. ......... 369/44.19 |
| 5,488,678 A | * | 1/1996 | Taneya et al. ................ 385/14 |
| 5,515,355 A | * | 5/1996 | Yamada ....................... 369/121 |
| 5,559,639 A | * | 9/1996 | Nakagishi et al. .......... 359/823 |
| 5,644,413 A | * | 7/1997 | Komma et al. .......... 369/44.23 |
| 5,995,479 A | * | 11/1999 | Takizawa et al. ........... 369/219 |
| 6,023,379 A | * | 2/2000 | Grassens et al. ............ 359/819 |
| 6,049,650 A | * | 4/2000 | Jerman et al. .............. 385/137 |
| 6,314,062 B1 | * | 11/2001 | Suzuki et al. ............ 369/13.17 |

FOREIGN PATENT DOCUMENTS

| | | | | |
|---|---|---|---|---|
| GB | 1 345 314 | 1/1974 | | |
| GB | 2 046 655 | 11/1980 | | |
| JP | 03220747 | 9/1991 | | |
| JP | 05181026 | 7/1993 | | |
| JP | 05181026 A | * | 7/1993 | ............ G02B/6/12 |
| JP | 10199015 | 7/1998 | | |

OTHER PUBLICATIONS

PCT/International Search Report for PCT/US 01/09974 dated Feb. 19, 2002.

* cited by examiner

*Primary Examiner*—Ramesh Patel
*Assistant Examiner*—Thomas Pham
(74) *Attorney, Agent, or Firm*—MacPherson Kwok Chen & Heid LLP

(57) ABSTRACT

Extremely small optical heads are being developed for use in optical storage devices. The heads typically include a light source, a lens and a photodetector array. The beam of light generated by the light source must be aligned precisely with central axis of the lens and with the photodetector array. Because the heads are so small, their components are fixed permanently together; no adjustments are possible after assembly. A system of this invention includes a rotational stage, a pair of X-translation stages, and a pair Y-translation stages. The stages are mounted in a mechanical path between first and second holding devices. One component of the head, which would typically include the light source, is held in the first holding device. Another component, which would typically include the lens, is held in the second holding device. The stages are adjusted until the light beam exits the first component on an axis that coincides with the center of rotation of the rotational stage. The position of the second component is adjusted until the light beam coincides with the axis of the lens. The first component is then rotated until the light beam strikes the photodetector array at an optimal position. The optimal position can be obtained by directing the light beam at a media driven by a tracking actuator and optimizing the output signal from the head.

16 Claims, 19 Drawing Sheets

SYSTEM AND METHOD FOR ALIGNING COMPONENTS OF OPTICAL HEAD

CROSS-REFERENCE TO RELATED APPLICATION

This application is related to application Ser. No. 09/457,104, filed Dec. 7, 1999, entitled "Low Profile Optical Head", which is incorporated by reference herein in its entirety.

FIELD OF THE INVENTION

This invention relates to optical heads used to write data to and read data from an optical disk, and in particular to a system and method for aligning the components of a miniature optical head for use in a personal electronic device such as a audio player or digital camera.

BACKGROUND OF THE INVENTION

The increasing miniaturization of computers and personal electronic devices (PEDs) has led to a need for extremely small components. The above-referenced application Ser. No. 09/457,104 describes a low profile optical head, used in optical disk storage devices, that can have a height (measured perpendicular to the optical disk) of, for example, 3.25 mm. A feature of the head is that its components are rigidly attached to each other with a permanent adhesive and cannot be adjusted after the head has been assembled. This distinguishes this head from the larger optical heads used in, for example, conventional compact disk (CD) players, where the light source or lens can be adjusted after assembly to ensure that the read-write beam is properly aligned with respect to the objective lens and photodetector.

A need exists, therefore, for an apparatus that can be used to properly align the extremely small components (light source, mirrors, lenses, etc.) in a low profile optical head.

SUMMARY OF THE INVENTION

This need is answered by the system and method of this invention. According to this invention, a system for aligning the components of an optical head comprises a rotational stage; a first mechanical path extending from a first side of the rotational stage, the first mechanical path comprising a first X-translation stage and a first Y-translation stage; a first holding mechanism attached to an end of the first mechanical path for holding a first component of the optical head; a second mechanical path extending from a second side of the rotational stage, the second mechanical path comprising a second X-translation stage and a second Y-translation stage; a second holding mechanism attached to an end of the second mechanical path for holding a second component of the optical head; and a Z-translation stage positioned so as to alter the spacing between the first and second holding mechanisms in a Z direction. The system also comprises a first microscope for viewing the first and second components of the optical head in a Z direction and a second microscope for viewing the first and second components of the optical head in a direction perpendicular to the Z direction.

In one embodiment, the first mechanical path comprises a stack comprising the first X-translation stage and the first Y-translation stage, the stack being mounted on the rotational stage. The first holding mechanism is mounted on the first Y-translation stage. The rotational stage is mounted on the second Y-translation stage, and the second Y-translation stage is mounted on a base member. The second X-translation stage is also mounted on the base member, and the Z-translation stage is mounted on the second X-translation stage. The second holding mechanism is mounted on the Z-translation stage. In addition, in this embodiment the system comprises a tracking actuator for holding a piece of optical media, an analog circuit for electrical connection to a component of an optical head held by one of the first and second holding mechanisms, and an oscilloscope electrically connected to the analog circuit. The tracking actuator is driven by a low-frequency oscillator and vibrates the piece of optical media in a direction parallel to the surface thereof and perpendicular to the data tracks on the surface thereof. The system can also comprise a focus actuator which is likewise driven by a low-frequency signal and vibrates the piece of media in a direction perpendicular to the surface thereof. By viewing the signals shown on the oscilloscope, the operator can determine whether the components of the optical head are correctly aligned before assembly.

This invention also includes a system for aligning the components of an optical head comprising a first holding device; a second holding device; a mechanical path extending between the first and second holding devices, the mechanical path comprising: a rotational stage; a first X-translation stage and a first Y-translation stage; a second X-translation stage and a second Y-translation stage; and a Z-translation stage positioned so as to alter the spacing between the first and second holding mechanisms in a Z direction.

This invention also includes a method of assembling the components of an optical head. The method comprises positioning first and second components of the optical head adjacent to each other; connecting the first component to a source of electrical power to energize a light source within the first component and thereby produce a light beam, the light beam following a forward path out of the first component and into, through and out of the second component; translating the first component in X and Y directions until the light beam emerging from the first component on a first section of the forward path coincides with a predetermined Z-axis; translating the second component in the X and Y directions until the light beam emerges from the second component on a second section of the forward path at a predetermined location on the second component; reflecting the light beam along a return path into, through and out of the second component; and rotating the first component about the Z-axis until the light beam in the return path strikes the first component at a predetermined location. The method also includes bonding the first and second components. The bonding can be performed by applying a UV adhesive and exposing the UV adhesive to UV radiation.

In another aspect, this invention includes a gripper for holding a component of an optical head. The gripper comprises a first jaw and a second jaw connected together at a pivot point, the first jaw comprising a first straight edge, and second jaw comprising second and third straight edges, the straight edges between positioned on the jaws such that the first straight edge is located between the second and third straight edges when the jaws are closed.

BRIEF DESCRIPTION OF THE DRAWINGS

This invention will be best understood by reference to the following drawings, wherein like components have like reference numerals. It should be noted that the drawings are not necessarily drawn to scale.

DESCRIPTION OF THE INVENTION

Figure 1:
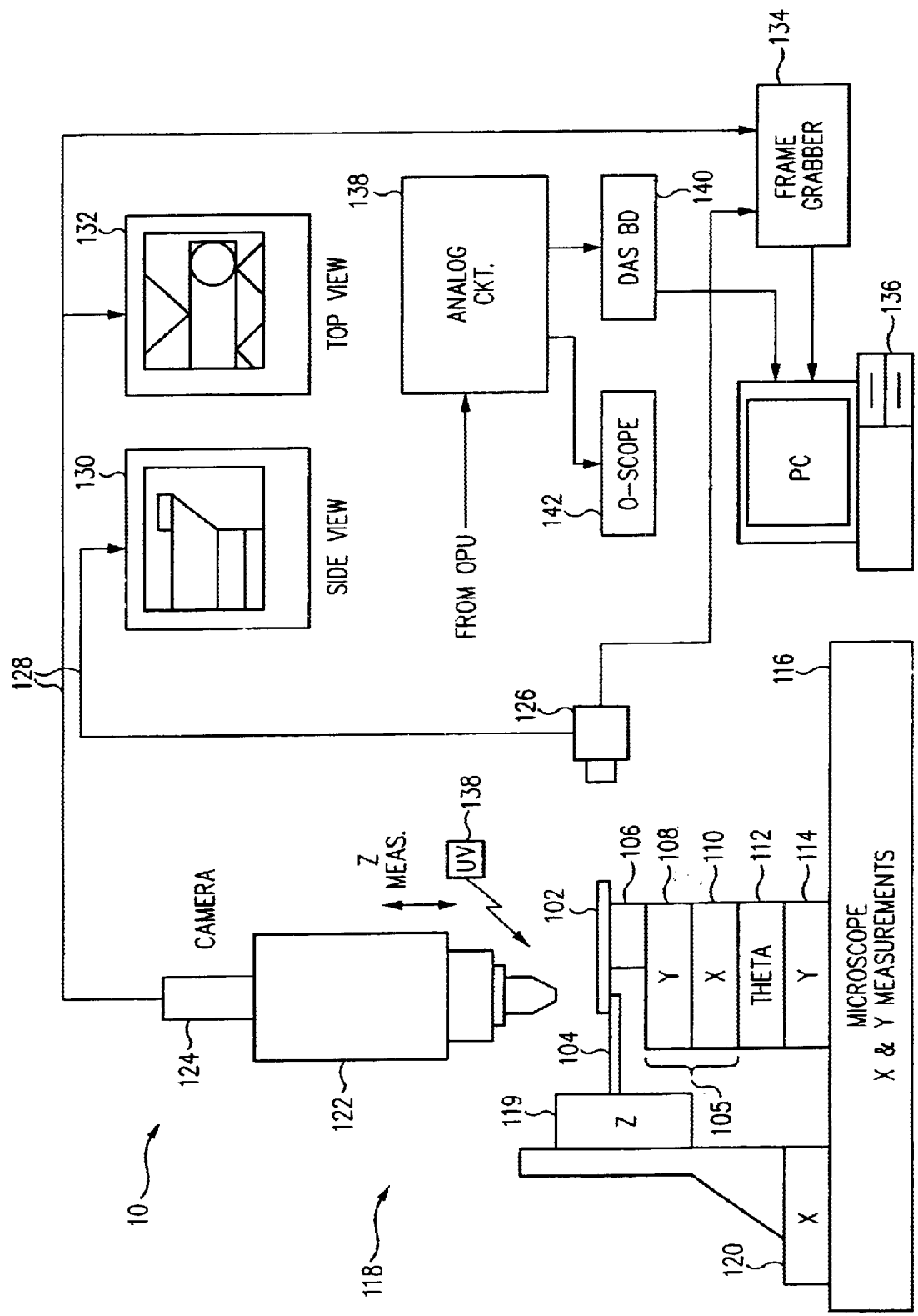
FIG. 1 is a conceptual block diagram of an alignment system in accordance with this invention.

A general view of an alignment system in accordance with this invention is shown in FIG. 1. Alignment system 10 includes a gripper 102 which functions as a holding mechanism for one component of the optical head and a cradle 104 which functions as a holding mechanism for a second component of the optical head. The two components to be aligned are not shown in FIG. 1.

Gripper 102, which is described in greater detail below, is mounted via a gripper base 106 on a stack 105 that includes a Y-translation stage 108 and an X-translation stage 110. Translation stages 108 and 110 are well known in the mechanical arts and are preferably constructed as steel stages with crossed roller bearings on the critical axes.

Stack 105 is mounted on a rotational (theta) stage 112, which in turn is mounted on a Y-translation stage 114. Y-translation stage 114 is mounted on a platform 116 of a measurement microscope 118. Cradle 104 is mounted on a Z-translation stage 119, which is mounted on an X-translation stage 120. X-translation stage 120 is mounted on the platform 116 along with Y-translation stage 114.

Figure 2A:
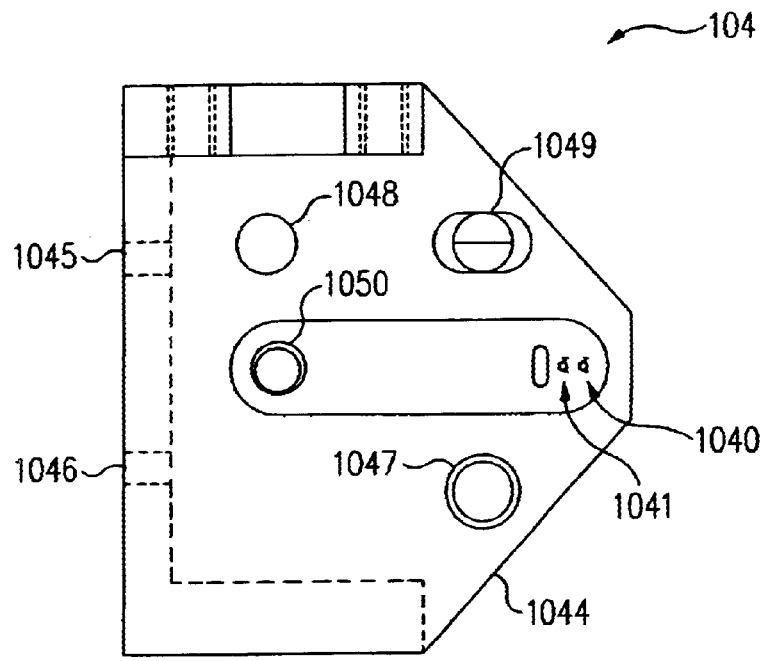
FIG. 2A is a top view of the cradle.
Figure 2B:
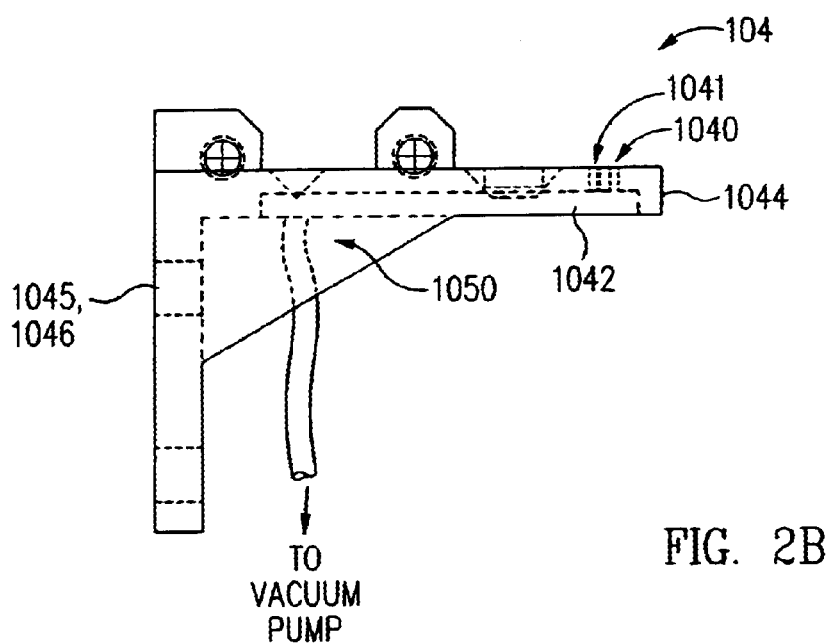
FIG. 2B is a side view of the cradle.

Cradle 104 is shown in FIG. 2A, which is a top view, and FIG. 2B, which is a side view. Cradle 104 includes a mounting base 1044 in which are formed vacuum holes 1040 and 1041. Holes 1040 and 1041 are in flow communication with a vacuum plenum 1042 within base 1044 and a port 1050 which is connected to a source of vacuum. As is well known, an object (herein a component of an optical head) can be "clamped" to the top surface of mounting base 1044 by placing it over vacuum holes 1040 and 1041 and creating a vacuum in the plenum. Holes 1045 and 1046 are for mounting cradle 104 to Z-translation stage 119 with mounting screws. Flat 1047, countersink 1048 and V-groove 1049 serve as kinematic mounting points for the quarter-wave plate orientation fixture and the media actuator, as described below.

FIGS. 10A–10D are detailed views of gripper 102. Gripper 102 includes jaws 802 and 804 that are connected together at a pivot point 806. Jaw 804 is rigidly fixed to gripper base 106 with two screws, and jaw 802 rotates with respect to jaw 804 about pivot point 806. Jaws 802 and 804 are biased towards a closed position by a spring 808 which can provide a closing force of 50 grams, for example. Jaw 802 comprises a first straight edge 810 (in a dimension perpendicular to the paper), and jaw 804 comprises a second straight edge 812 and a third straight edge 814. Straight edges 810, 812 and 814 are positioned such that straight edge 810 is located between straight edges 812, 814 when jaws 802 and 804 are closed position. Jaw 802 comprises a ridge 816 having a first planar side 818 and a second planar side 820, the first and second sides 818, 820 between oriented with respect to each other at an angle a. Straight edge 810 is located at a junction of the first and second sides 818, 820. Jaw 804 comprises a V-shaped cavity 822, the straight edges 812, 814 being located on opposite sides of the V-shaped cavity 822. The ridge 816 and cavity 822 are formed in complementary shapes such that ridge 816 mates with cavity 822 when the jaws are closed.

Gripper 102 (and gripper base 106) can be removed from Y-translation stage 108, as necessary, to allow other devices to be attached to the Y-stage.

Figure 10A:
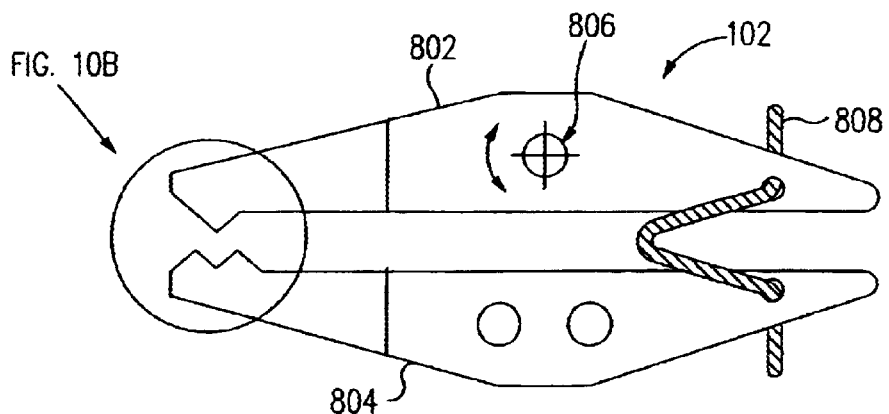
FIGS. 10A–10D are detailed views of the gripper useful in holding a component of the optical head during assembly.
Figure 10B:
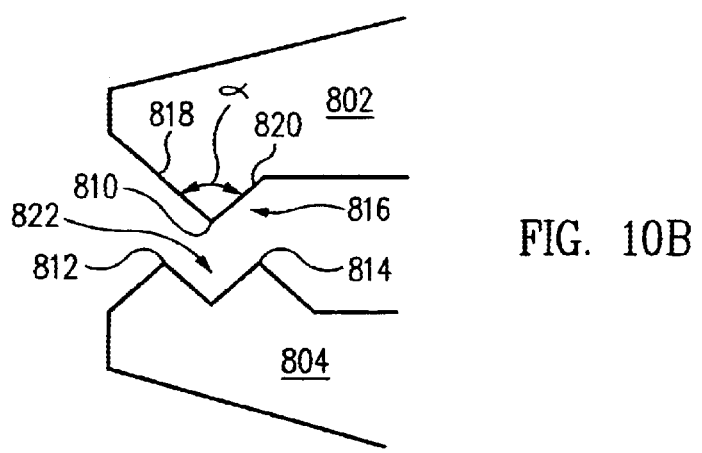
Figure 10C:
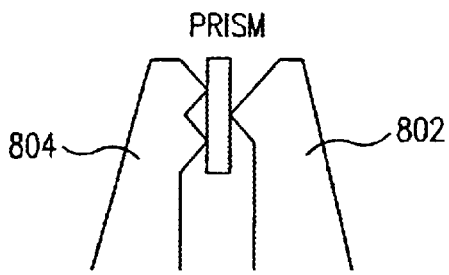
Figure 10D:
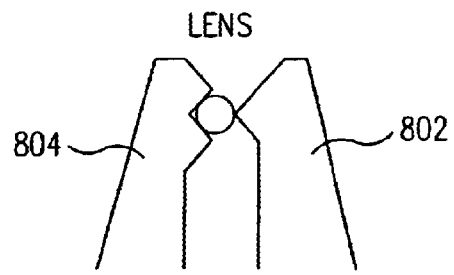

An object is placed in gripper 102 by manually squeezing the ends of the jaws 802, 804 against the force of spring 808 and then releasing the jaws. FIGS. 10C and 10D show how a rectangular object, such as a prism, or a cylindrical object, such as a lens, can readily be held in gripper 102.

Referring again to FIG. 1, each of stages 108, 110 and 119 is equipped with a differential micrometer (not shown) to allow precision adjustment of the components mounted in gripper 102 and on cradle 104 with respect to each other. The translation and rotational stages and micrometers are available from Newport Corp. of Irvine, Calif.

To summarize, gripper 102 can be rotated by rotation stage 112 and can be translated in the X direction by stage 110 and in the Y-direction by stages 102 and 114. Cradle 104 can be translated in the Z direction by stage 119 and in the X direction by stage 120. While the Z direction is shown as being vertical and the X and Y directions are shown as being horizontal in FIG. 1, it should be understood that this need not be the case in all embodiments. The X, Y and Z directions refer to any three mutually perpendicular axes, however oriented.

Platform 116 is a part of measurement microscope 118. In this embodiment, microscope 118 is a Nikon model MM-40-L3 measurement microscope. Microscope 118 includes a head unit 122, which contains a magnification lens system and a video camera 124 and allows the optical head components to be viewed in the Z direction. Platform 116 can be adjusted in the X and Y directions and head unit 122 can be adjusted in the Z direction. The view downward through head unit 122 includes a pair of perpendicular cross-hairs which can be rotated.

System 10 also includes a side view video microscope 126, which is mounted to the cradle 104 (for clarity, microscope 126 is shown as being separate in FIG. 1). Microscope 126 allows a view of the optical head components in a plane perpendicular to the Z direction. This allows the operator to bring the components together in the Z direction without risk of "crashing" them during assembly. In this embodiment, microscope 126 has a fixed magnification of approximately 25 (from object to the monitor screen of computer 136). Because microscope 126 is mounted to cradle 104, the cradle 104 appears at a fixed position in microscope 126. Even when Z-translation stage 119 is moving cradle 104, cradle 104 appears to be stationary and gripper 102 appears to be moving in the view through microscope 126. In one embodiment, video microscope 126 contains aboard camera CCD model VM1030A, available from Circuit Specialists of Mesa, Ariz., and a 40 mm f/3.2 camera lens available from Universe Kogaku (America) of Oyster Bay, N.Y.

In addition, alignment system 10 includes a source of ultraviolet (UV) light 138, which is positioned with respect to gripper 102 and cradle 104 such that a beam of UV light from source 138 can be used to cure a UV adhesive and thereby bond components held by the gripper 102 and cradle 104. UV light source 138 can be a high-intensity device which allows a curing time of 20 seconds or less and can have dual light pipes which allow two locations to be cured simultaneously. UV light source 138 is typically positioned ¼ inch to 1 inch from the components to be bonded. UV light source can be the Green Spot model, available from UV Source, Inc., of Torrance, Calif.

Microscopes 118 and 126 provide video signals on lines 128 which are used to generate a side view (illustrated in box 130) and a top view (illustrated in box 132) of gripper 102, cradle 104 and the components to be assembled. The side and top views are observed by passing the video signals on lines 128 to closed-circuit video monitors. Video signals are passed to a frame grabber 134 to allow computer analysis of the images. Cameras 134A and 134B are connected to frame grabber 134.

Figure 3A:
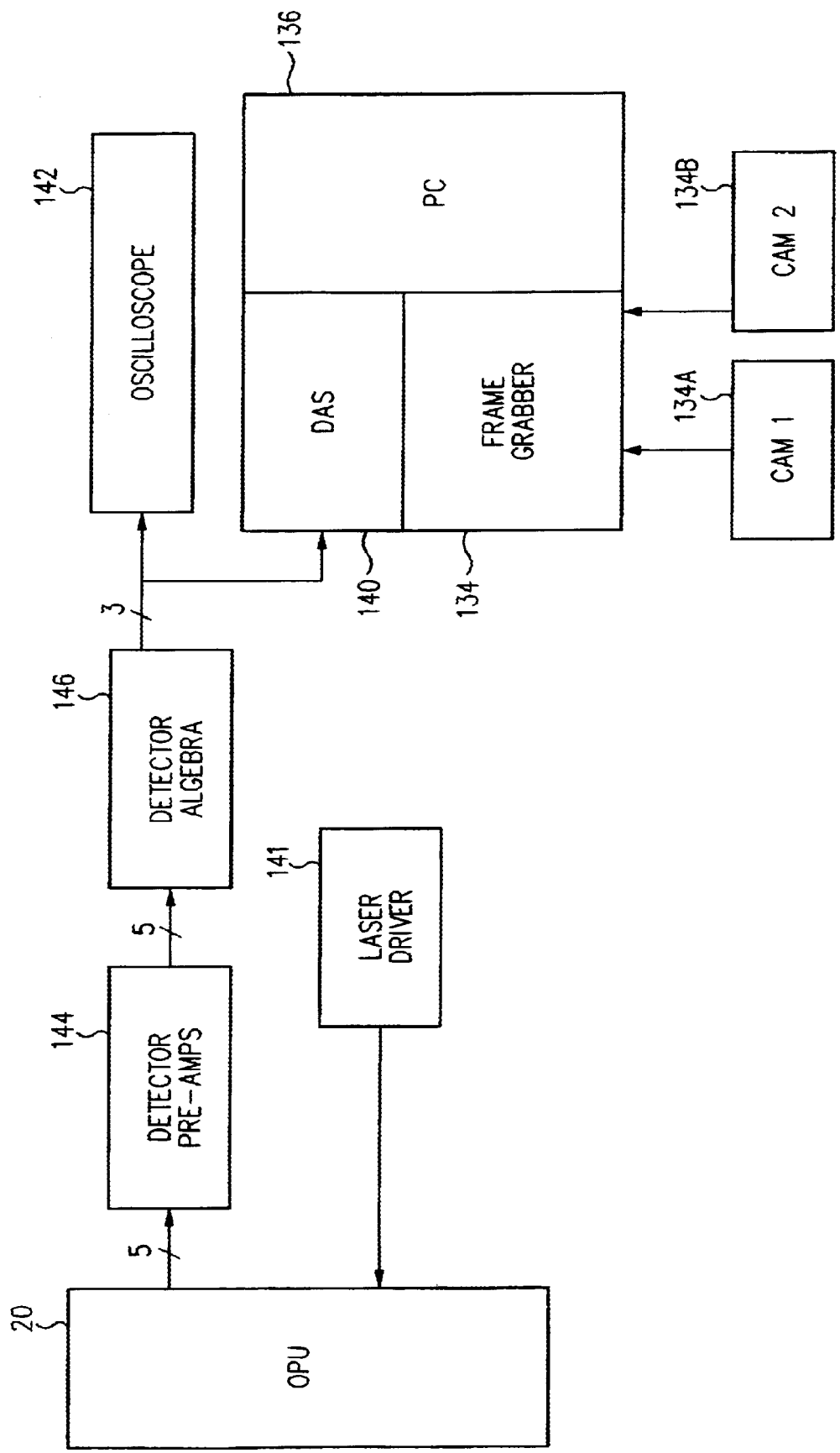
FIG. 3A is a block diagram of the analog signal processing circuit.

FIG. 3A shows a block diagram of the analog signal processing circuit. Laser driver 141, which is connected to the laser diode 202 in optical pick-up unit 20, is available from Elantec Corp. of Milpitas, California (model EL 6259 C). Data acquisition system 140 is available from National Instruments of Austin, Texas (model PCI-Mio-16E-1). Frame grabber 134 can be purchased from ImageNation of Beaverton, Oregon (model PX 610 A). Oscilloscope 142 can be the Infinium model, available from Hewlett Packard.

Figure 3B:
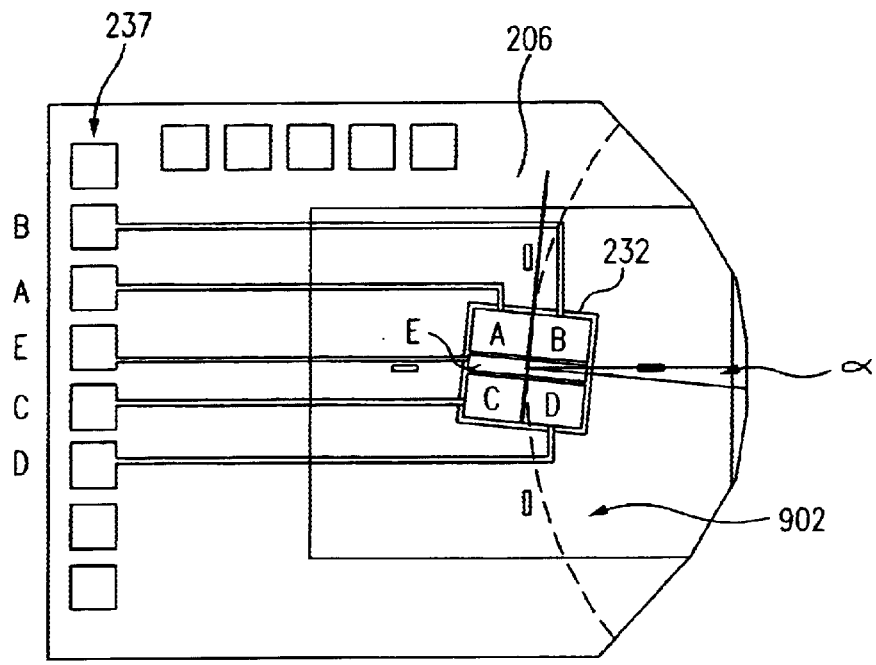
FIGS. 3B and 3C show top views of the photodetector array in the optical head.
Figure 3C:
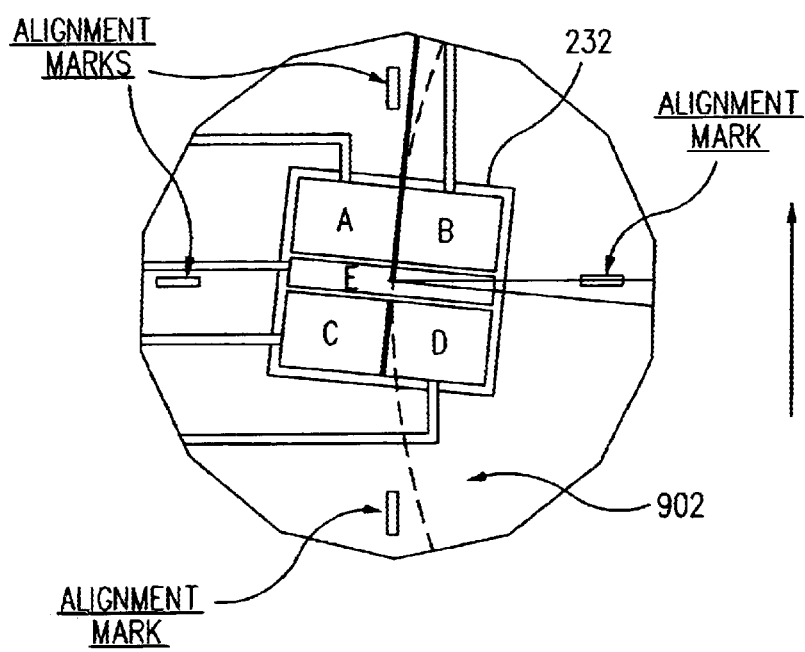

FIGS. 3B and 3C show top views of photodetector array 232, FIG. 3B being at a magnification of about 100X and FIG. 3C being at a magnification of about 200X. As shown, photodetector array 232 contains five sections A–E and is mounted at an angle $\alpha$ with respect to the longitudinal axis of sub-mount 206 because in this embodiment optical head 20 is mounted on a rotary actuator which pivots about a point as head 20 sweeps across a disk. Photodetector array 232 can measure 0.3 mm×0.32 mm; the width of section E can be 0.05 mm; and the spacing between the sections can be 0.005 mm. The angle $\alpha$ is set such that the track is parallel to the length of section E when the head 20 is positioned at a midpoint between the inner and outer diameters of the data regions of the disk. In effect, the angle $\alpha$ minimizes the error that occurs because of the change in the direction of the data tracks as head 20 moves to different positions on the disk. In one embodiment, angle $\alpha$ is 6.745°. Each of sections A–E is a photodiode formed in silicon sub-mount 206 in a well known manner and is connected by a conductive trace to a corresponding pad in a connector 237 in silicon sub-mount 206.

Figure 3D:
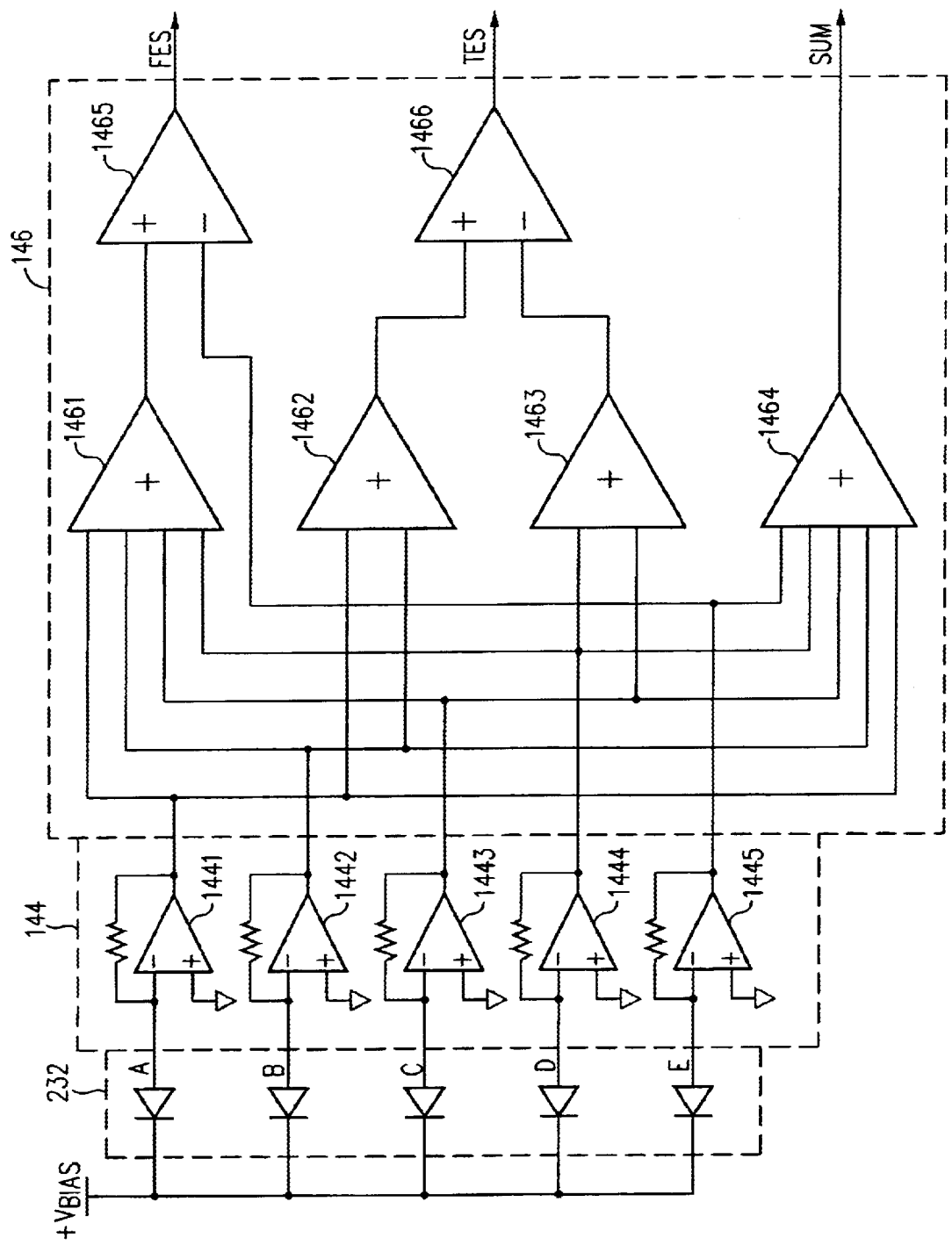
FIG. 3D is a schematic diagram of the detector pre-amplifiers and the detector algebra unit.

FIG. 3D is a schematic diagram of detector pre-amp unit 144 and detector algebra unit 146. Sections A–E of photodetector 232 are represent by photodiodes A–E. Each of the photodiodes A–E is connected to one of transimpedance amplifiers 1441–1445 within pre-amp unit 144. The output terminals of the transimpedance amplifiers are connected to summing amplifiers 1461–1464 and difference amplifiers 1465 and 1466 in detector algebra unit 146 to produce three output signals: a focus error signal (FES), a tracking error signal (TES) and signal that is the sum of the outputs of photodiodes A–E (SUM). FES, TES and SUM are delivered to oscilloscope 142.

As will be apparent:

$FES=(A+B+C+D)-E$ $TES=(A+B)-(C+D)$ $SUM=A+B+C+D+E$

Detector pre-amps 144 and detector algebra unit 146 can be constructed from operational amplifiers available from Texas Instruments (model TL 084).

Figure 4:
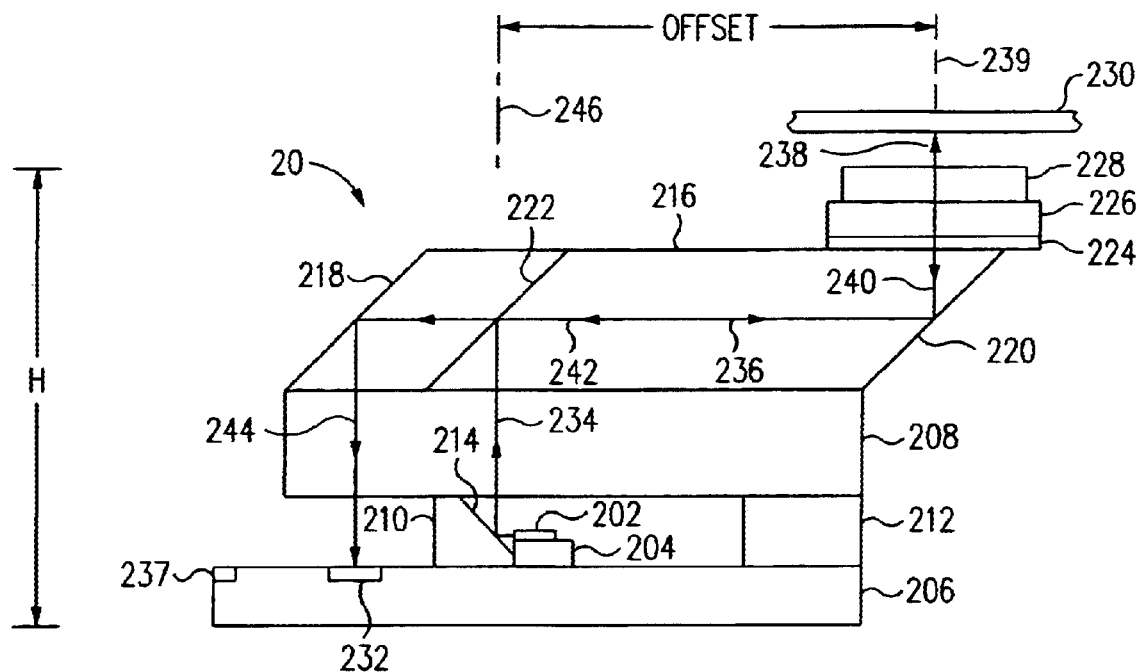
FIG. 4 is a side view of a low-profile optical head that can be aligned using the system and method of this invention.
Figure 5:
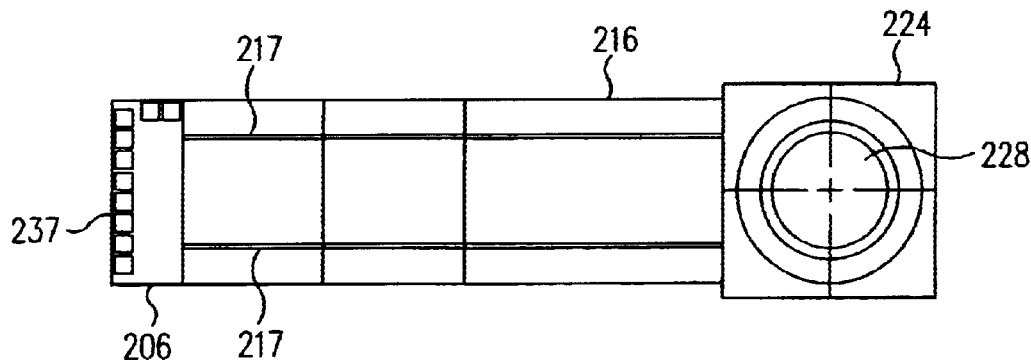
FIG. 5 is a top view of the optical head.
Figure 6:
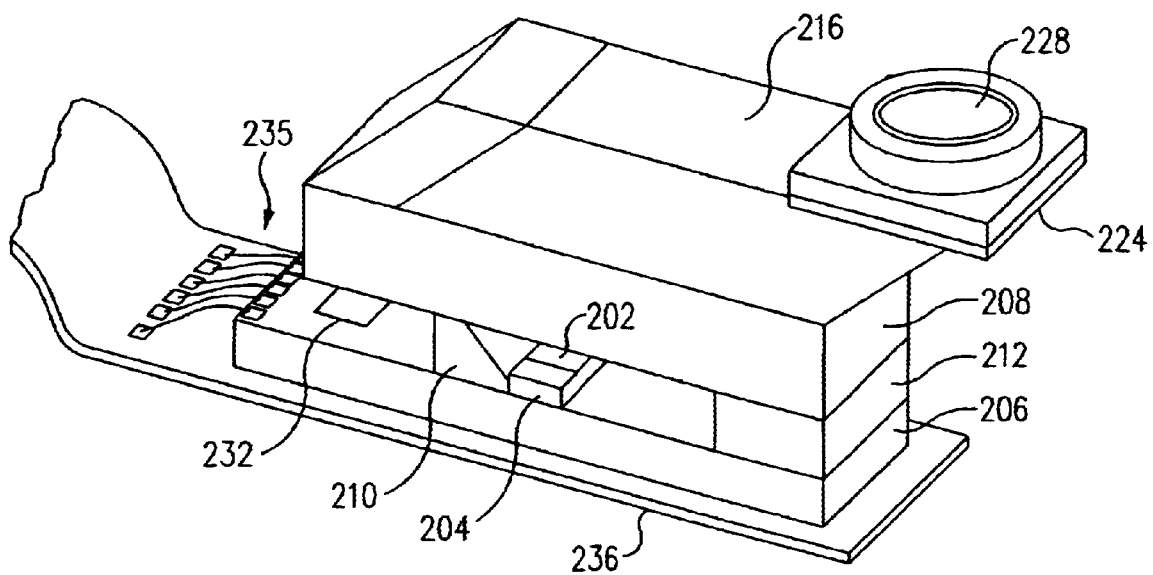
FIG. 6 is a perspective view of the optical head.

FIGS. 4, 5, and 6 are side, top and perspective views, respectively, of a low-profile optical head or optical pick-up unit (OPU) 20 that can be assembled using alignment system 10. The light source in optical head 20 is an edge-emitting laser diode 202 that is mounted on a laser mount 204. Laser mount 204 in turn is mounted on a sub-mount 206 which can be a die cut from a silicon wafer. Above laser diode 202 is an optical die 208, which can include lenses, gratings, holograms and other optical components or devices. Interposed between sub-mount 206 and optical die 208 are spacer blocks 210 and 212, one side of spacer block 210 being provided with a 45° turning mirror 214 that reflects the horizontal laser beam produced by laser diode 202 to a vertical upward direction.

Mounted atop optical die 208 is a prism or periscope 216, that can be made of a number of materials, including fused silica or flint glass ($SF_2$), and that is transparent to the laser beam emitted by laser diode 202. The ends of periscope 216 are angled at about 45° to the horizontal and are coated with a substantially reflective coating such as aluminum or silver to form turning mirrors 218 and 220. Periscope 216 also includes an internal polarization beam splitter surface 222, also angled at about 45° with respect to the horizontal, which is substantially reflective (i.e., acts as a mirror) for light of a first polarization and substantially transmissive for light of a second polarization.

Mounted on top of periscope 216 are a quarter-wave plate 224, a lens spacer 226 and an objective lens 228. Also shown in FIG. 4 is a section of an optical media 230, which is positioned a preselected distance (e.g., 0.3 mm) from objective lens 228.

As in conventional optical heads, the laser beam emitted by laser diode 202 follows a forward path to optical media 230, where it is reflected along a return path to a photodetector array 232 in the sub-mount 206. In this embodiment, the forward path includes a first section 234 between turning mirror 214 and beam splitter surface 222, a second section 236 between beam splitter surface 222 and turning mirror 220, and a third section 238 between turning mirror 220 and optical media 230. The return path includes a first section 240 between optical media 230 and turning mirror 220, a second section 242 between turning mirror 220 through beam splitter surface 222 to turning mirror 218, and a third section 244 between turning mirror 218 and photodetector array 232. As will be understood by those skilled in the art, the polarization of the beam emitted by laser diode 202 is such that the beam is reflected by beam splitter surface 222 on its forward path; as the beam passes through quarter-wave plate 224 in the forward and return directions, the polarization of the beam is changed such that the beam passes through beam splitter surface 222 on its return path.

Optical head 20 is powered through wire bonds 235 located at one end of sub-mount 206. As shown in FIG. 6, sub-mount 206 is mounted with epoxy or another adhesive in a recess formed in the surface of a flex circuit 236, which can be, for example, a Kapton copper flex circuit. Wire bonds 235 are formed between pads in connector 237 and pads on the flexible circuit 236. The data signals generated in optical head 20 are also carried by the flex circuit 236.

Optical head 20 is typically of an extremely small size. For example, the height H of head 20 can be only 3.25 mm.

Many additional details concerning optical head 20 are described in the above-referenced application Ser. No. 09/457,104.

For optical head 20 to function properly, it is essential that the laser beam pass through the central axis 239 of lens 228 (see FIG. 4). Otherwise, the beam will not be properly focused on the optical media 230. In addition, the beam must fall at precisely the correct location on photodetector array 232. There are numerous manufacturing tolerances and other sources of error that can affect these two requirements, for example: the angle at which the laser beam emerges from laser source 202, the positioning of laser source 202 on laser mount 204, the angles of turning mirrors 214, 218 and 220 and of beam splitter surface 222, and the locations of lens 228 with respect to periscope 216 and of photodetector 232 in sub-mount 206. In conventional optical heads, certain of the components, such as the laser source and mirrors, can be adjusted after assembly to achieve the correct alignment. In optical head 20, however, because of its miniature size, all elements are permanently bonded together during assembly and later adjustment is impossible.

Figure 7:
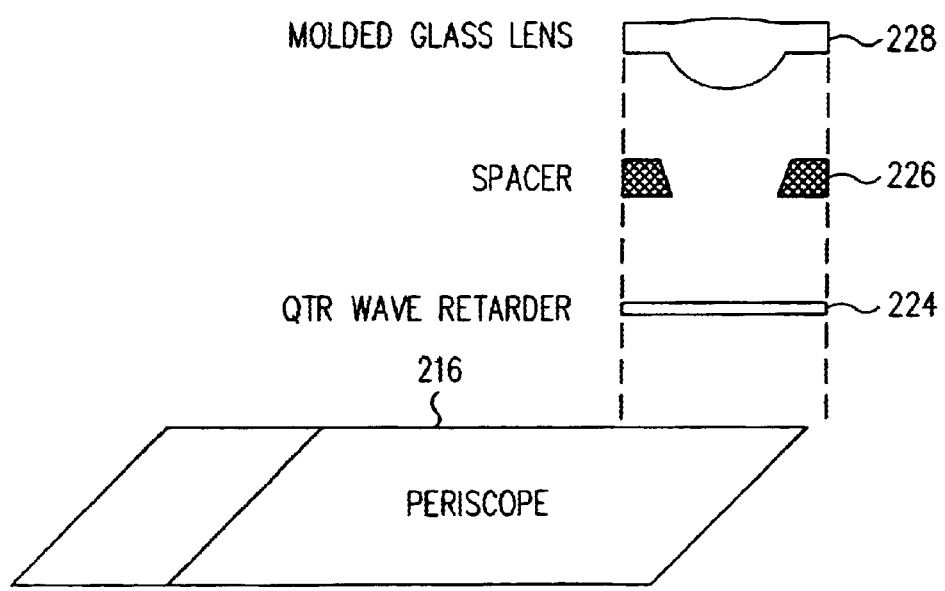
FIG. 7 is an exploded view of the periscope-lens assembly of the optical head.
Figure 8:
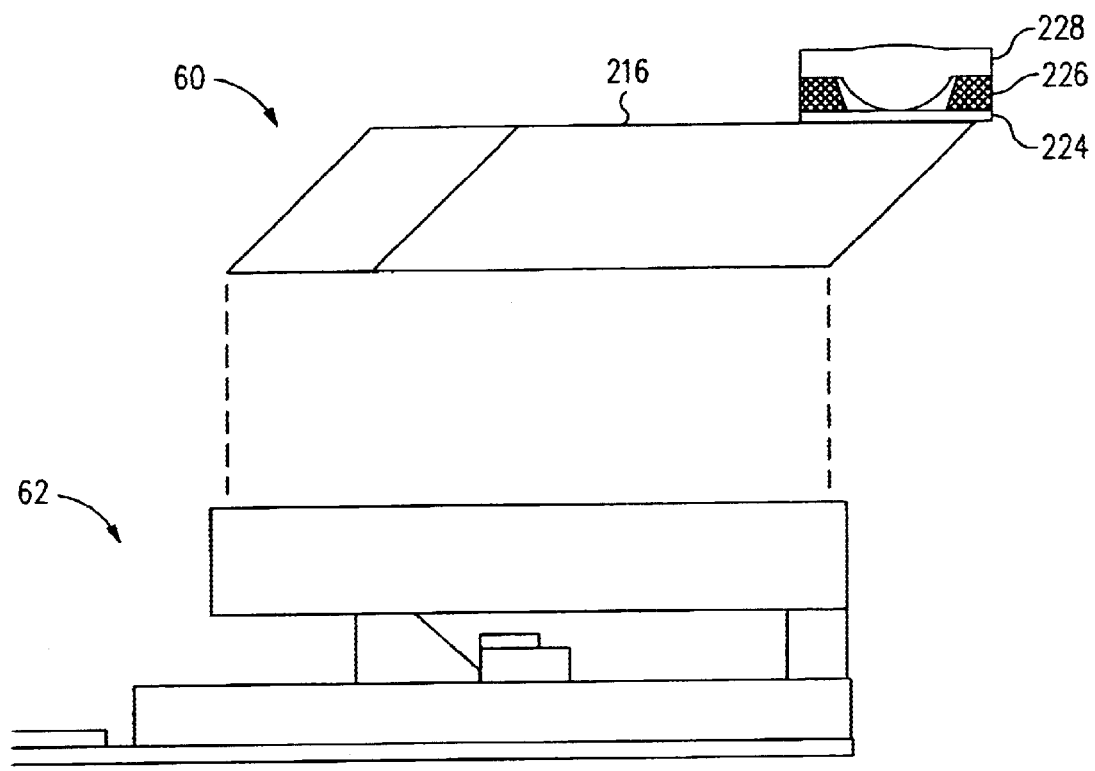
FIG. 8 is an exploded view showing the periscope-lens assembly and the optical pickup unit (OPU) assembly of the head.

As shown in FIGS. 7 and 8, optical head 20 can be assembled in several stages. In one sequence, spacer 226 is initially attached to lens 228. Quarter-wave plate 224 is then attached to periscope 216, and the lens-spacer assembly is attached to quarter-wave plate 224. To complete the assembly of optical head 20, periscope-lens assembly 60 must be attached to OPU assembly 62. As described above, this must be accomplished in such a way that the laser beam is correctly aligned with both lens 228 and photodetector array 232.

The following is a detailed description of this process.

Set-up of Microscope 118

Initially, before the process of assembly can begin, the components of microscope 118 and the translation and rotational stages must be properly set up. The movement axes of X-translation stages 110 and 120 and Y-translation stages 108 and 114 and the surface of cradle 104 must be made parallel to the platform 116 of microscope 118. This is done using a granite surface plate and a dial indicator. The movement of microscope head 122 and Z-translation stage 119 must be made perpendicular to platform 116.

Attachment of Spacer 226 to Lens 228.

Figure 12A:
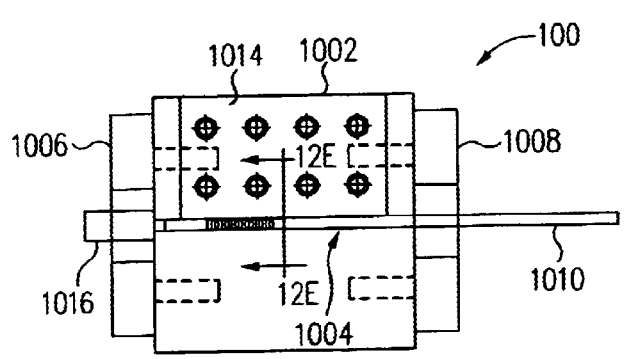
FIGS. 12A–12H are views of the lens-spacer alignment tool.
Figure 12C:
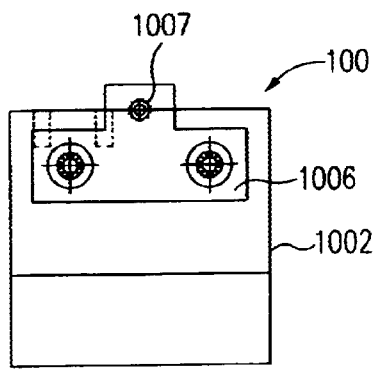
Figure 12B:
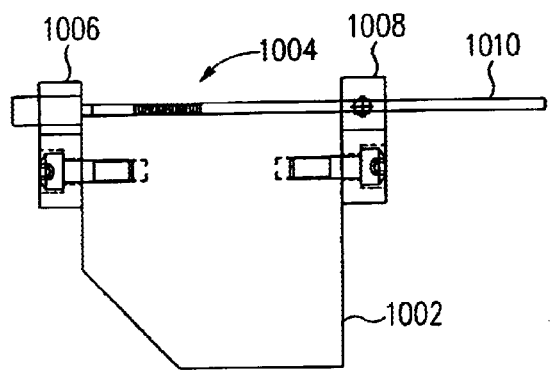
Figure 12D:
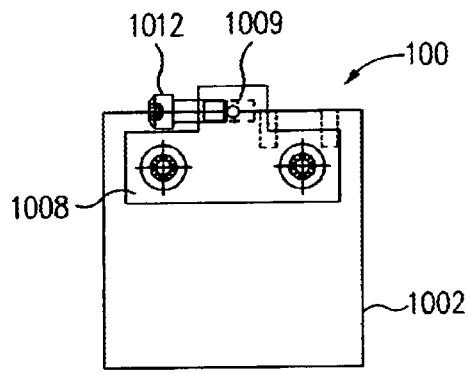
Figure 12E:
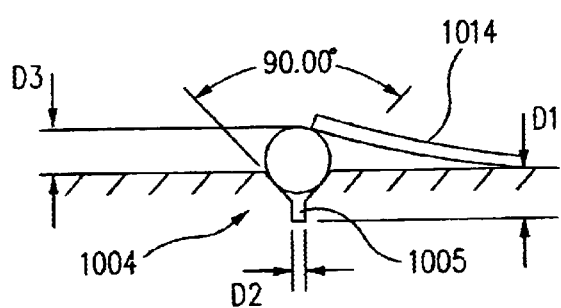
Figure 12F:
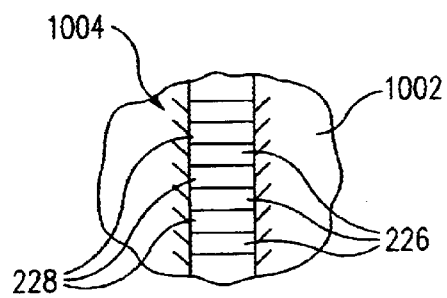

Spacer 226 is attached to lens 228 using the spacer-lens bonding fixture 100, shown in FIGS. 12A–12H. A groove 1004 is formed in the top surface of a metal block 1002, which could be a cube of black anodized aluminum measuring 1½"×1½"×1½", for example. Side plates 1006 and 1008 are attached to the sides of block 1002 with screws, as shown in FIGS. 12A and 12B. Side plate 1006 has a hole 1007 bored through it, into which a spring-loaded plunger 1016 is fixed. Side plate 1008 has a hole 1009 bored in it, into which a gage pin 1010 is inserted and attached with a set screw 1012. As shown in FIG. 12F, a stack of lenses 228 and lens spacers 226 is placed in groove 1004, with the lenses 228 alternating with the spacers 226. Groove 1004 has planar sides that are angled at 90° with respect to each other. As shown in FIG. 12E, a trough 1005 is cut at the bottom of groove 1004 to accommodate square lenses if necessary. In one embodiment, the depth of the groove (D1) is 0.035", the width of the trough 1005 (D2) is 0.010", and the diameter of gage pin 1010 is 0.051". In this embodiment, the geometry of groove 1004 is adjusted such that the distance (D3) that gage pine 1010 protrudes above the surface of block 1002 is 0.035"±0.005".

After the fixture 100 has been cleaned to remove any dirt or old adhesive, the stack of lenses and spacers is placed in groove 1004, and spring-loaded plunger 1016 is tightened to apply an axial load urging the stack against gage pin 1010. As shown in FIGS. 12A and 12E, a spring plate 1014 is attached with screws to the surface of block 1002 on one side of groove 1004. When so attached, spring plate 1014 ensures that the lenses 228 and spacers 226 are securely seated in groove 1004.

A small dot of a UV adhesive such as NOA 63 adhesive, available from Norland Optical Adhesive, is applied to the interface between each lens-spacer pair. Within 10 seconds of application, the stack is exposed to UV light. Spring plate 1014 and spring-loaded plunger 1016 are released, and the lens-spacer pairs are rotated 180° with a tweezers. A dot of UV adhesive is applied to the other side of each lens-spacer pair and the stack is again exposed to UV light. Finally, spring plate 1014 and spring-loaded plunger 1016 are released, and lenses 228 and spacers 226 are removed from fixture 100.

Figure 12G:
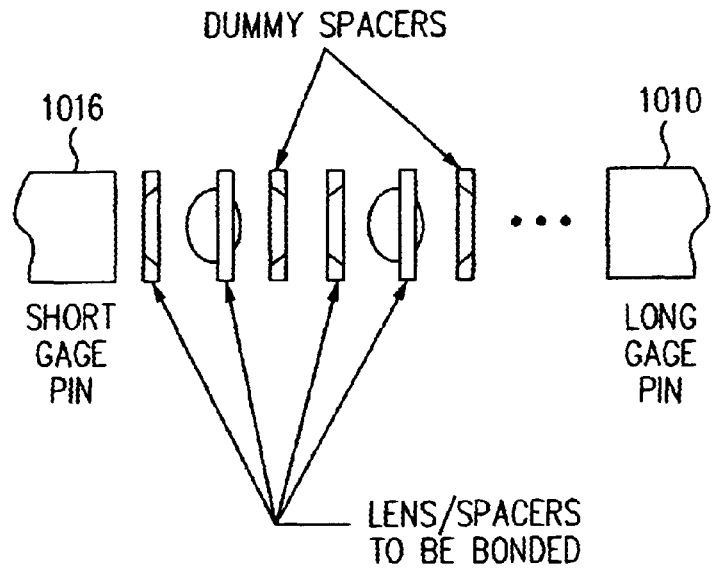
Figure 12H:
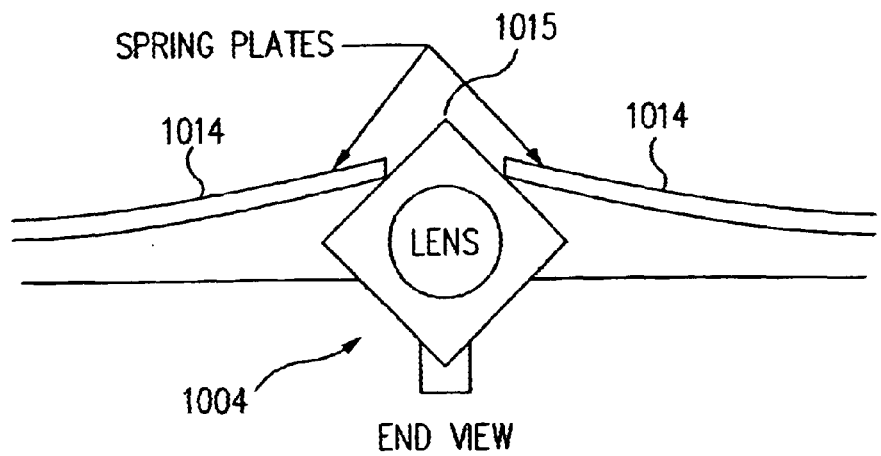

As shown in FIGS. 12G and 12H, the groove 1004 can also accommodate square lenses, in which case the perpendicular edges of the spacers contact the sides of the groove. Also, dummy spacers may be placed between the lens-spacer pairs that are to be bonded. Two spring plates 1014 may be used, as shown in FIG. 12H. One dot of the UV adhesive is applied at the apex 1015, one of spring plates 1014 is removed, and another dot of the adhesive is applied on the exposed side of the lens-spacer pair.

Attachment of Quarter-wave Plate 224 to Periscope 216

Figure 9A:
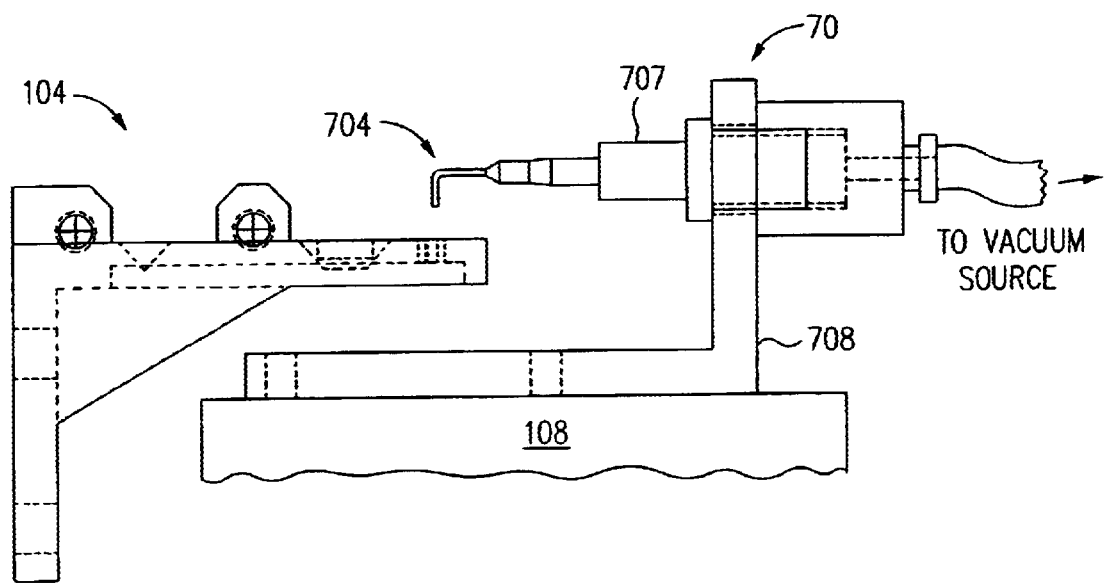
FIG. 9A illustrates the placement of the vacuum-tipped holding device on the upper Y-translation stage.
Figure 9B:
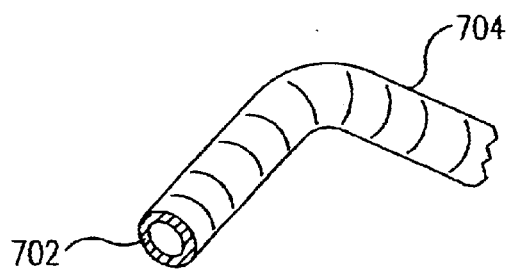
FIG. 9B is a close-up view of the the vacuum-tipped holding device.
Figure 9C:
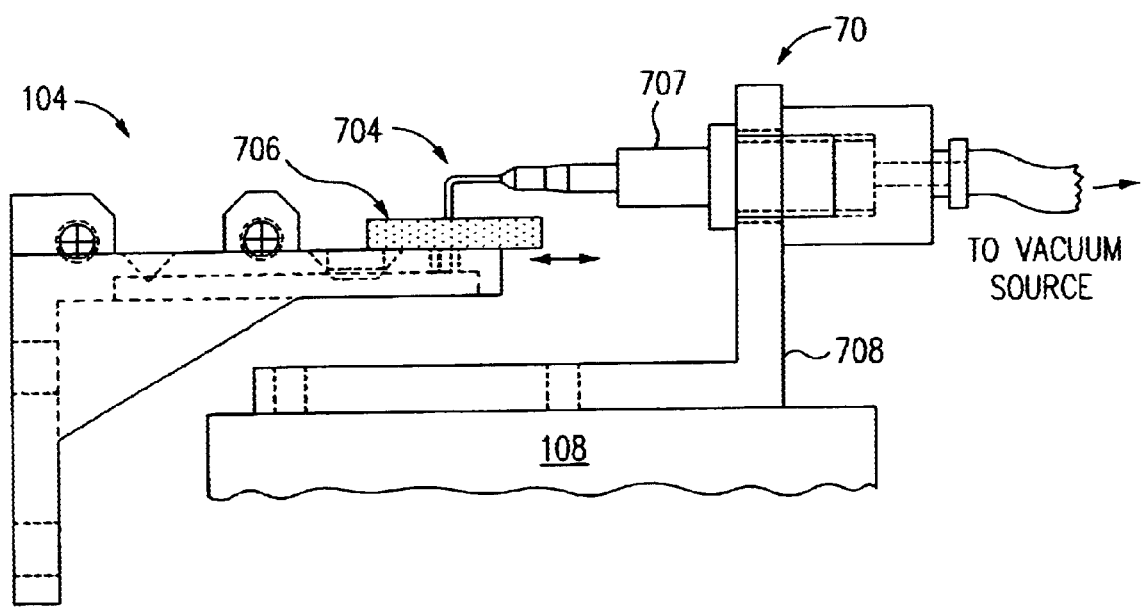
FIG. 9C illustrates the polishing of the end of the vacuum-tipped holding device.

Advantageously, to ensure that quarter-wave plate 224 is positioned properly on periscope 216, quarter-wave plate 224 is held using a vacuum-tipped holding device 70 that is fabricated as shown in FIGS. 9A–9C. Vacuum-tipped holding device 70 includes a tube 704 that is attached to a holding fixture 707 and a mounting bracket 708. Mounting bracket 708 can be mounted on Y-translation stage 108, as shown in FIG. 9A. Tube 704 can be made of stainless steel adhesive dispensing tip available from EFD, Inc. of East Providence, R.I. (part number 5120-B-90). The end 702 of tube 704 needs to be extremely flat, smooth and parallel to cradle 104 to enable adequate grip and proper positioning of optical components. This is achieved by placing a series of grinding and polishing stones 706 between cradle 104 and tube 704 and adjusting the Z-translation stage such that the grinding stone is gently clamped between the cradle and tube. The honing process starts with a coarse stone and ends with an ultra-fine stone; 3 or 4 stones of progressively finer grit can be used. As shown in FIG. 9C, grinding stone 706 is moved manually back and forth between cradle 104 and tube 704 (preferably in a FIG. 8 pattern), thereby polishing the end 702 and also the top surface of cradle 104. The polished end 702 has an extremely flat annular surface that, when a vacuum is applied to the interior of tube 704, holds quarter-wave plate 224 (or any other object having a flat surface) in a very precise, repeatable position. Tube 704 can have an inner diameter of 0.60 mm and an outer diameter of 0.91 mm, which is suitable for holding a quarter-wave plate 224 measuring 1.3×1.3×0.040 mm.

Initially, periscope 216 is placed on cradle 104 but no vacuum is applied. Periscope 216 is viewed under the microscope and, if dirty, is removed and cleaned with acetone and a cotton swab. Periscope 216 is gripped with gripper 102 and cradle 104 is lowered 25 microns. Using stage 112, periscope 216 is rotated until its edge is parallel to the movement of microscope 118 in the X-direction within 3 microns over the length of the periscope. To do this, platform 116 is moved back and forth in the X-direction and stage 112 is rotated until the edge of periscope 216 remains centered in the cross-hairs in the view through microscope 118.

Next, the offset of periscope 216 is measured. Periscope 216 is placed in gripper 102. The vacuum in cradle 104 is released, and cradle 104 is lowered 25 microns. Periscope 216 is moved out of the field of view of microscope 118. Microscope 118 is focused on cradle 104. The cross-hairs in microscope 118 are centered on the right edge of vacuum hole 1041 in cradle 104. The X readout of microscope 118 is zeroed at this point. Using gripper 102, periscope 216 is moved into position over the vacuum holes in cradle 104. Microscope 118 is refocused until the surface of cradle 104 is visible through quarter-wave plate 224. The X-stage of microscope 118 (platform 116) is then moved until the right edge of vacuum hole 1041 is aligned with the cross-hairs of microscope 118. The displacement of microscope 118 in the X-direction is recorded. This is the offset of periscope 216, i.e., the distance between axes 246 and 239 shown in FIG. 4.

Cradle 104 is lifted 25 microns and periscope 216 is vacuum-clamped to cradle 104. Periscope 216 is released from gripper 102, and gripper 102 is removed and replaced by vacuum-tipped holding device 70.

The quarter-wave plates are prepared by placing several of them on a clean microscope slide and separating those with the anti-reflective (AR) coating facing upward from those with the AR coating facing downward. The plates with the AR coating facing upward appear to have orange edge chips when viewed under a microscope using a 110X objective lens.

Figure 11A:
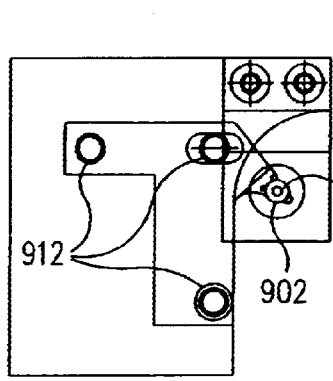
FIGS. 11A and 11B are top and side views, respectively, of the quarter-wave plate orientation jig.
Figure 11C:
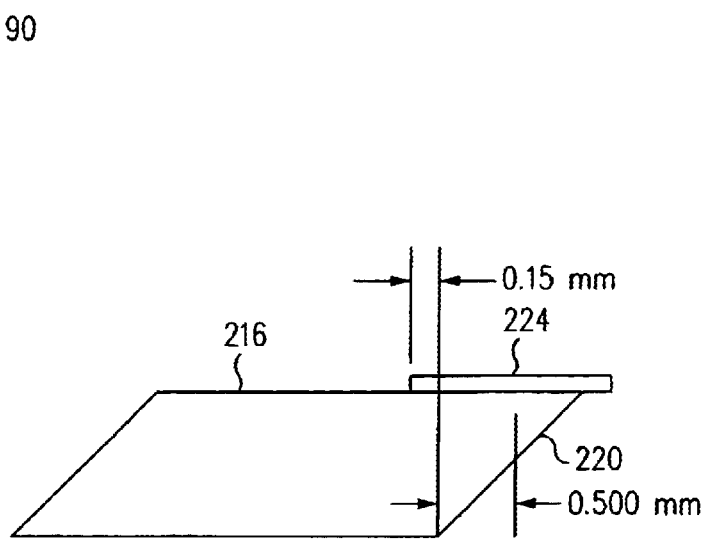
FIG. 11C is a side view showing the placement of the quarter-wave plate on the periscope.
Figure 11B:
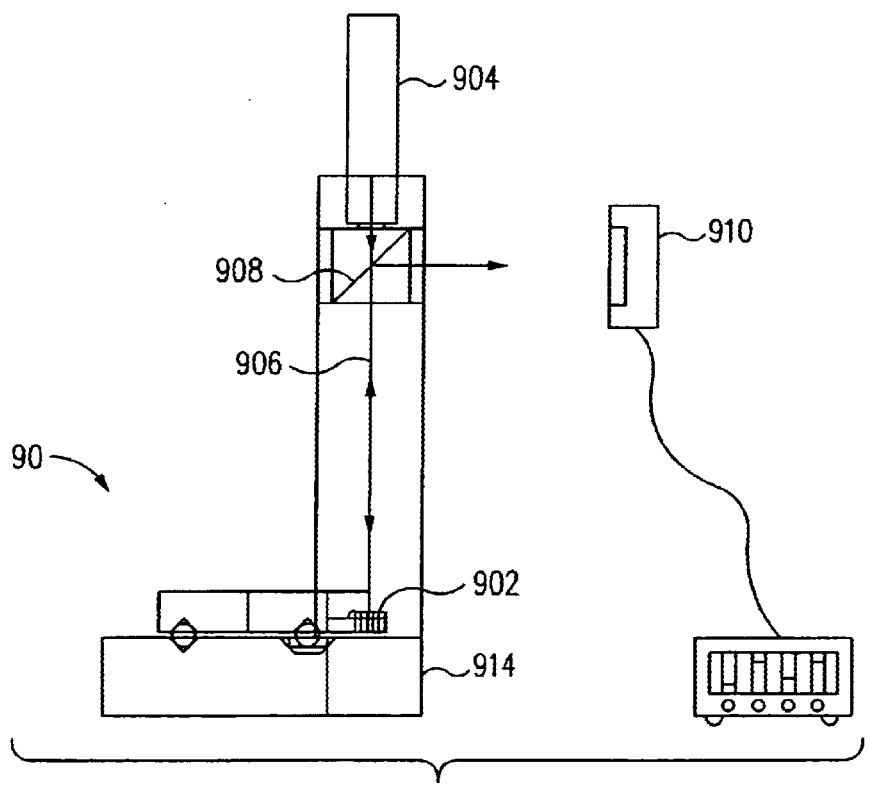

If necessary, the polarization directions of quarter-wave plate 224 can be oriented properly before placement on periscope 216 using the orientation jig 90 shown in FIGS. 11A and 11B. Jig 90 is a known type of device. A quarter-wave plate 224 with its AR coating facing upward is placed on the center of a rotatable mirror 902. A laser source 904 directs a laser beam 906 downward through polarization beam splitter 908. Laser beam 906 passes through quarter-wave plate 224 and is reflected from mirror 902. Since the polarization of beam 906 is changed by passing twice through quarter-wave plate 224, on its return path beam 906 is reflected from polarization beam splitter 908 to an optical power meter 910. Mirror 902 is rotated until the reading at optical power meter 910 reaches a maximum. Jig 90 has three kinematic mounting points 912 (e.g., balls) that mate with kinematic mounting points (e.g., a countersink, a groove and a flat) in a kinematic base member 914, to ensure that jig 90 is positioned at a precise, repeatable position with respect to base member 914. Kinematic mounting points 912 also mate with kinematic mounting points 1047, 1048, 1049 in cradle 104.

Once the power received in meter 910 is at a maximum, jig 90 is removed from base 914 and placed on cradle 104, with kinematic mounting points 912 in base 914 in mating contact with kinematic mounting points 1047, 1048, 1049 in cradle 104. Because of the placement of kinematic mounting points 1047, 1048, 1049 (see FIG. 2A), there is adequate room on cradle 104 for both jig 90 and periscope 216.

Vacuum-tipped holding device 70, shown in FIG. 9A, is mounted onto Y-translation stage 108. Using Y-translation stage 108 and X-translation stage 110, the end of tube 704 is brought into contact with the surface of quarter-wave plate 224, and a vacuum is applied to tube 704. Quarter-wave plate 224 is lifted from mirror 902. Again, using the Y-translation stage 108 and X-translation stage 110, quarter-wave plate 224 is moved to its approximate position with respect to periscope 216, 25 microns above the top surface of periscope 216. Using microscope 118 and Z-translation stage 119, periscope 216 is lifted and quarter-wave plate 224 is adjusted laterally until quarter-wave plate 224 is centered with respect to periscope 216 in the Y-direction and the edge of quarter-wave plate 224 is located 0.15 mm to the left of the junction between turning mirror 220 and the lower surface of periscope 216, as shown in FIG. 11C. This alignment is performed by using microscope 118 to focus on the lower surface of periscope 216.

A small dot of a UV adhesive is placed at a corner where quarter-wave plate 224 meets periscope 216. For this purpose NOA 61 adhesive from Norland Optical Adhesive can be used. To arrive at the proper separation between quarter-wave plate 224 and periscope 216 (1–2 microns), Z-translation stage 119 is adjusted manually until a "rainbow" (i.e., white light fringes) appears between quarter-wave plate 224 and periscope 216. When the adhesive has wicked to cover the entire area between quarter-wave plate 224 and periscope 216, the adhesive is exposed to UV light from source 138 (see FIG. 1).

Periscope 216 is left vacuum-clamped to cradle 104. Vacuum-tipped holding device 70 is replaced with gripper 102 on Y-translation stage 108.

Attachment of Lens-spacer Assembly to Quarter-wave Plate 224

The vacuum is released and cradle 104 is lowered 25 microns. Using gripper 102, periscope 216 is re-positioned over vacuum holes 1040, 1041 and aligned with its edge parallel to the microscope's X-stage movement, as described above, by moving platform 116 back and forth until the edge of periscope 216 remains centered in the cross-hairs. Cradle 104 is raised until it contacts periscope 216 and the vacuum is applied through holes 1040, 1041. Gripper 102 is removed and replaced by vacuum-tipped holding device 70.

The assembled combination of lens 228 and spacer 226 is placed on cradle 104 adjacent to periscope 216. If the lens-spacer combination is rectangular (square), it is rotated with vacuum-tipped holding device 70 until its edge (flange) is parallel to the microscope's X and Y stages. The offset distance in the X direction between the flange and the center of lens 228 is measured and recorded.

The nominal (approximate) position of the optical axis of the lens on quarter-wave plate 224 is identified. This is done by identifying a position that is centered between the edges of periscope 216 and located 0.500 mm to the right of the intersection between the diagonal and lower surfaces of periscope 216, seen by focusing through the periscope (see FIG. 11C). The cross-hairs are placed at this location, and the X and Y readouts of microscope 10 are zeroed.

Microscope 10 is moved so that the cross-hairs are centered in the X-direction at the offset distance (between the flange and the center of lens 228, as measured above) from the nominal position of the lens' optical axis. Using vacuum-tipped holding device 70, the lens-spacer assembly is moved until its edge is aligned to the cross-hairs in the X-direction and it is centered visually on periscope 216 in the Y-direction. Cradle 104 is raised until quarter-wave plate 224 makes flat contact with spacer 226.

A small dot of NOA 63 UV adhesive is placed on one corner of quarter-wave plate 224 and exposed to UV light within 10 seconds. This process in then repeated on two of the three remaining corners of quarter-wave plate 224, thereby completing the assembly of periscope-lens assembly 60 (FIG. 8). The vacuum in cradle 104 is released and periscope-lens assembly 60 is removed and stored.

Assembly of OPU Assembly 62

OPU assembly 62 can be assembled using various known techniques. Laser diode 202 and laser mount 204 are mounted on the top surface of silicon sub-mount 206, as are spacer blocks 210 and 212. Methods such as gluing and laser soldering can be used. Optical die 208 is then bonded to the spacer blocks 210 and 212. Photodetector array 232 (described below) is formed in the top surface of silicon sub-mount 206 by known methods.

Assembly of Periscope-lens Assembly to OPU Assembly

The remaining task is to correctly align the periscope-lens assembly 60 with the OPU assembly 62. The following are the steps of this process:

1. Flex circuit 236 (FIG. 6), which has OPU assembly 62 mounted thereon, is placed on cradle 104. A small dot of a thermal grease is applied to cradle 104 where it contacts flex circuit 236, directly below laser diode 202. Flex circuit 236 is positioned carefully, using gripper 102, so that alignment marks (shown in FIG. 3C)) on silicon sub-mount 206 are within 3 microns of the microscope' X-axis. A vacuum is applied to cradle 104, clamping flex circuit 236 in place, and three dots of NOA 68 UV adhesive are applied at the end of flex circuit 236 on which OPU assembly 62 is mounted and two strips of 0.1 inch wide tape are applied along the lateral edges of flex circuit 236. When the UV adhesive has been exposed and cured, the vacuum is released. The rotational alignment of the flex circuit is confirmed.

2. Power is supplied to OPU assembly 62 through flex circuit 236, turning on laser diode 202, which emits a laser beam that is reflected from turning mirror 214 and directed upward along axis 246 (shown in FIG. 4), which coincides with section 234 of the laser beam. The laser current is set to the lowest possible level. Caution: It is hazardous to look into the microscope eyepiece with the laser turned on. Care must be exercised to ensure that the power supplied to the laser diode does not reach a level that can cause eye damage. As necessary, the manufacturer of the laser diode should be consulted to determine the maximum current (power) that can safely be supplied to the laser during visual inspection through the microscope.

3. With OPU assembly 62 held on cradle 104, Y-translation stage 114 and X translation stage 120 are adjusted, using the differential micrometers connected to these stages, until axis 246 of the laser beam coincides with the rotational axis of stage 112 in the view through microscope 118. This can be done by viewing the emission point of the laser beam while moving stages 110, 114, 120, simultaneously or alternately, until the beam (axis 246) coincides with the center of rotation of stage 110. As is apparent from FIG. 1, rotational stage 112 (and the rotation axis thereof) is translated in the Y-direction by stage 114, while cradle 104 and OPU assembly 62 are translated in the X-direction by stage 120. Thus, in this embodiment, the step of aligning axis 246 with the rotational axis of stage 120 actually involves translating OPU assembly 62 (and axis 246) in the X-direction and translating the center of rotation of rotational stage 120 in the Y-direction. In other embodiments, this need not be the case. (Since periscope-lens assembly 62 is not involved in this step, stages 108 and 110 are adjusted such that periscope-lens assembly 62 does not interfere with the alignment of axis 246 and the rotational axis of stage 110. Z-translation stage 119 is set such that OPU assembly 62 is well below periscope-lens assembly 60 and no contact between them can occur.)

4. Once axis 246 of the laser beam coincides with the rotational axis of stage 112, the cross-hairs of microscope 118 are centered over the emission point of the laser beam, and the X and Y settings of the microscope are zeroed.

5. Head unit 112 of microscope 118 is moved in the X-direction to the offset of periscope 216, measured as described above.

6. Using gripper 102, periscope-lens assembly 60 is brought to a position approximately 25 microns above the OPU assembly 62 (which as described above is attached to cradle 104) and then released onto the OPU assembly. Periscope-lens assembly 60 is then regripped with gripper 102 to ensure parallelism. Cradle 104 is lowered 15 microns.

7. Using stages 108 and 110, periscope-lens assembly 60 is adjusted in the X and Y-directions until the focused laser spot emerging from lens 228 is centered on the X and Y cross-hairs of microscope 118. Head unit 122 of microscope 118 is then moved in the Z direction until it is up and out of the way.

8. The power supplied to the laser diode 202 is increased to approximately 45 mA. Note: At this point and hereafter the laser beam must not be viewed through the microscope. An optical power meter is placed above objective lens 228 and the laser current is adjusted until approximately 0.5 mW is emitted from the lens. A few minutes are allowed for the laser power to stabilize, and then the actual power level is recorded.

Figure 15:
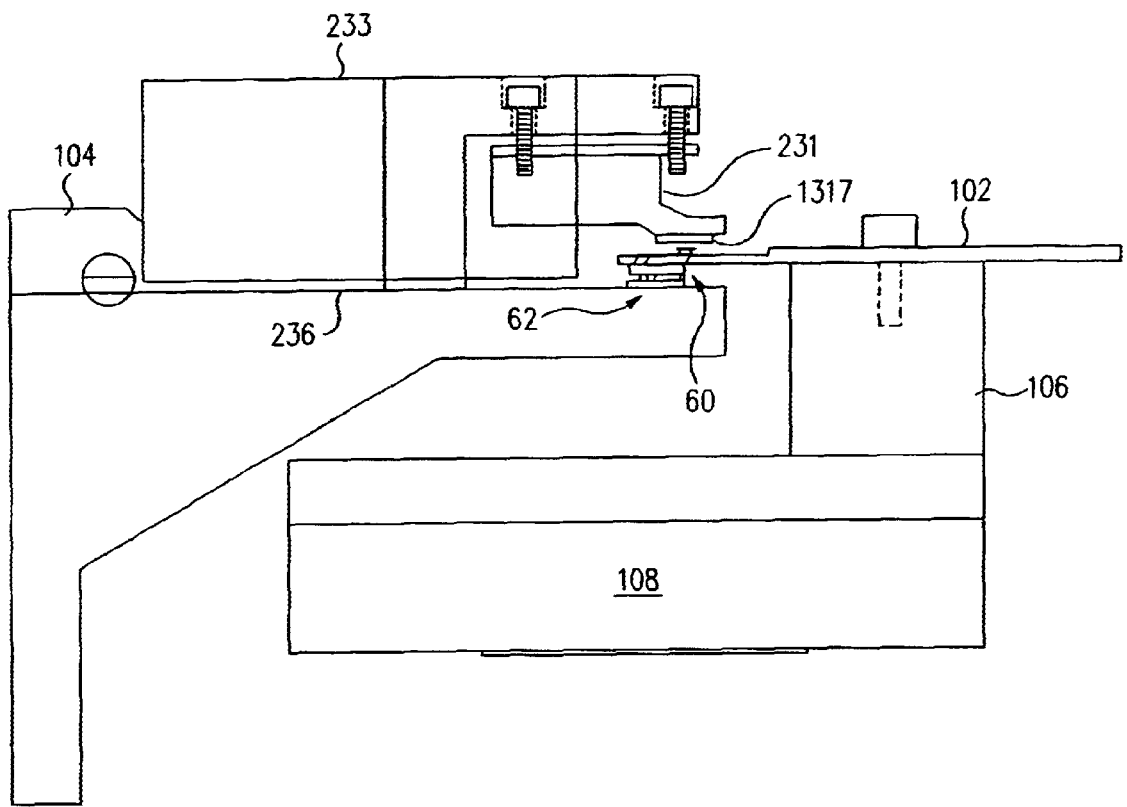
FIG. 15 is a side view of the media actuator mounted on the cradle.

9. The media-actuator 231 is placed on cradle 104. FIG. 15 shows a side view of media actuator 231 on cradle 104. Media actuator 231 is attached with screws to a kinematic mounting block 233 which has kinematic mounting points (e.g., balls) at the same relative locations as kinematic mounting points 912 in jig 90 (see FIG. 11A). The kinematic mounting points in mounting block 233 thus mate with kinematic mounting points 1047, 1048, 1049 in cradle 104 to position media 230 directly over the lens 228 of the periscope-lens assembly 60. Media actuator 231 can be a focus and tracking actuator of, for example, a standard Compact Disc (CD) player such as a player manufactured by Philips. Media piece 230 is attached to actuator 231. Media 230 is a piece cut from an optical media, such as a standard CD, which contains prerecorded tracks of digital data. Media piece 230 can be circular.

Figure 16:
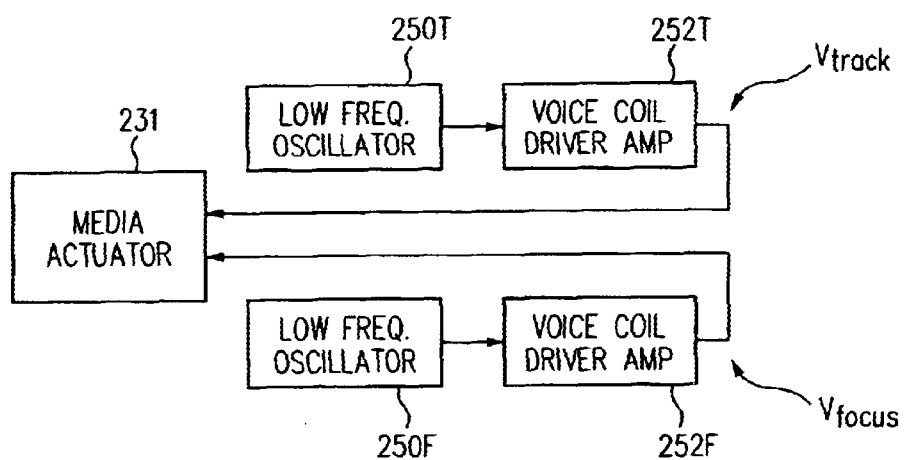
FIG. 16 is a block diagram of the drive circuitry for the media actuator.

As shown in the block diagram of FIG. 16, media actuator 231 is driven by a pair of low-frequency (e.g. 5 Hz) oscillators 250T, 250F, which output sine-wave signals through a pair of voice coil driver amplifiers 252T, 252F. The output of voice coil driver amplifier 252F causes media actuator 231 to vibrate in a direction perpendicular to the surface of optical media 230; this is the focus drive signal ($V_{focus}$). The other signal causes media actuator 231 to vibrate in a direction parallel to the surface of media 230 but perpendicular to the optical tracks on media 230; this is the tracking drive signal ($V_{track}$). The voice coil driver amplifiers can be acquired from Burr-Brown of Tucson, Arizona (model OPA 544).

10. Referring again to FIGS. 1 and 4, with translation stages 108, 110, 114 and 120 fixed, rotational stage 112 and periscope-lens assembly 60 are adjusted (rotated) until the laser beam forms a "spot" at the correct location on photodetector array 232. This means that section 244 in the return path of the laser beam strikes the photodetector array 232 at the optimal location. Since section 234 in the forward path of the laser beam (axis 246) is aligned with the axis of rotation of stage 112, rotating stage 112 does not change the location of section 234 or the forward or return path of the laser beam within lens-periscope assembly 60. Thus, the laser beam remains aligned with the central axis 239 of lens 228. As stage 112 and lens-periscope assembly 60 rotate, however, the laser beam sweeps across photodetector array 232 in an arc. The dashed line 902 in FIGS. 3B and 3C represents the path of the laser beam across photodetector array 232 as stage 112 is rotated. As is evident from FIGS. 3B and 3C, section photodetector array 232 allows a margin of error for the path 902 in a direction generally parallel to the length of section E.

11. The correct position of the periscope-lens assembly 60 is determined by viewing the output of photodetector array 232 on oscilloscope 142. Initially, the tracking signal $V_{track}$ is applied to media actuator 231 (FIG. 16), producing the tracking error signal (TES) in oscilloscope 142. The outputs of sections A–E of photodetector array 232 are delivered to oscilloscope 142 through the detector pre-amps 144 and detector algebra unit 146 as shown in FIG. 3D. Z-translation stage 119 is adjusted until the amplitude of the TES is maximized, indicating that the beam is focused on the media piece 230.

12. Stage 112 is rotated until the TES is centered about 0 volts, as viewed on oscilloscope 142. This indicates that the periscope-lens assembly 60 is positioned optimally with respect to the OPU assembly 62.

13. Media actuator 231 is removed from the kinematic mounting points on cradle 104. A small dot of NOA 63 UV adhesive is applied to one corner of the interface between lens-periscope assembly 60 and OPU assembly 62. When the UV adhesive has wicked along one-half of the length of periscope 216 or has begun to cross one of the glue stop gutters 217 (see FIG. 5), the adhesive is exposed to UV light from unit 138. Glue stop gutters 217 are grooves formed in the top surface of optical die 208 to prevent the adhesive from getting into the central area of head 20 where it might interfere with the optics. Glue stop gutters 217 can be 0.1 mm wide and 0.1 mm deep. Lens-periscope assembly 60 is released from gripper 102, and gripper 102 is moved out of the way using stages 108 and 110.

14. The three remaining corners of the interface between lens-periscope assembly 60 and OPU assembly 62 are bonded in the same manner.

This completes the alignment and assembly of optical head 20. In many instances it will be desirable to test the assembled head to ensure that it is in fact properly aligned, although this is not necessary to the invention and in fact may become unnecessary in practice as experience with the techniques of this invention grows. The following are the steps of a possible test procedure:

1. Media actuator 231 is replaced on cradle 104, $V_{track}$ is applied, and the TES on oscilloscope 142 is recorded, using the oscilloscope' SAVE WAVEFORM and SAVE SCREEN features.

2. In the same manner, the FES, TES and SUM signals are recorded with the $V_{focus}$ signal applied to media actuator 231. This information can be used to help predict the performance of the focus and tracking servos in an engine using the optical head.

3. It may be useful to have a profile of the spot generated by the oprtical head. The spot size can help to predict the performance of the head during reading operations. This can be obtained using a SpotScan™ knife edge profiler (model 0390), available from Photon inc. of Santa Clara, Calif. The spot profiler is placed on cradle 104, the correct drive current is supplied to laser diode 202, and the size of the spot in the tangential direction (parallel to the data track) and radial direction (perpendicular to the data track) are measured.

Figure 13A:
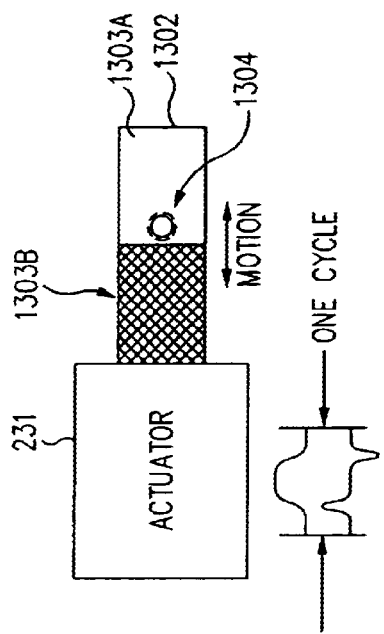
FIGS. 13A–13I illustrate the use of a knife-edge plate to generate an intensity profile of the laser spot.
Figure 13B:
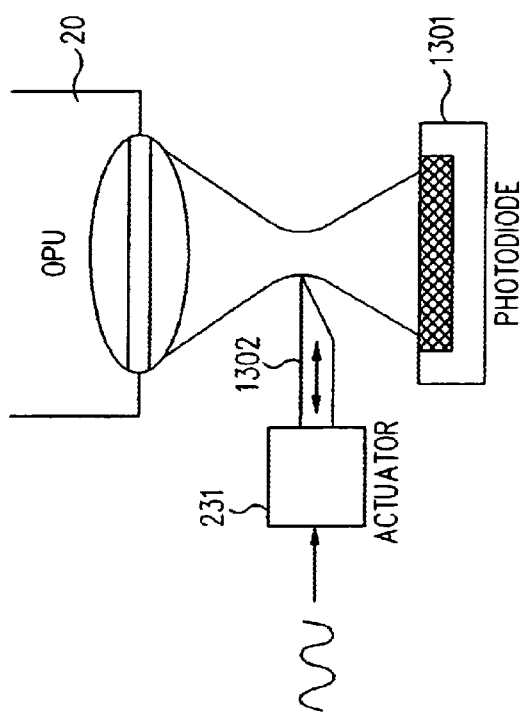
Figure 13C:
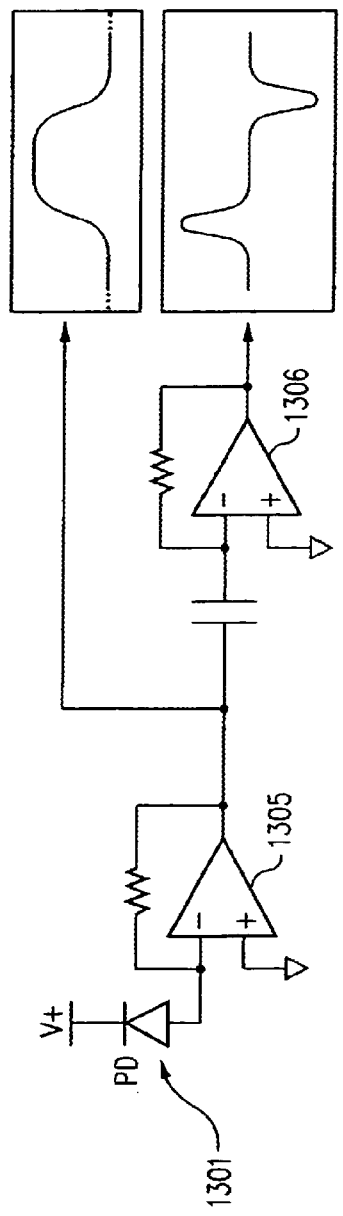
Figure 13D:
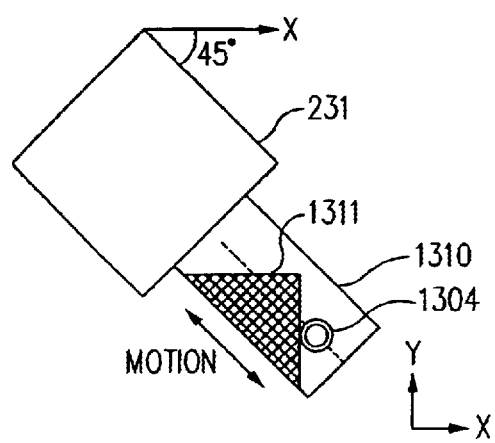

Alternatively, an arrangement of the kind shown in FIGS. 13A–13C can be used to profile the spot. A glass knife-edge plate 1302 is attached to actuator 231, plate 1302 having a transparent portion 1303A and an opaque portion 1303B, the latter being covered with a film of an opaque material such as chrome. Knife-edge plate 1302 is positioned between the optical head 20 and a photodiode 1301, such that the laser beam from the optical head 20 intersects the plate. The tracking motion of actuator 231 is turned on, and plate 1302 oscillates back and forth, with the laser spot 1304 passing from the transparent portion to the opaque portion of the plate. The output of photodiode 1301 is passed through an operational pre-amplifier 1305 and a differentiator 1306 which, as shown, generate electrical signals representing the profile of the laser spot 1304.

Figure 13E:
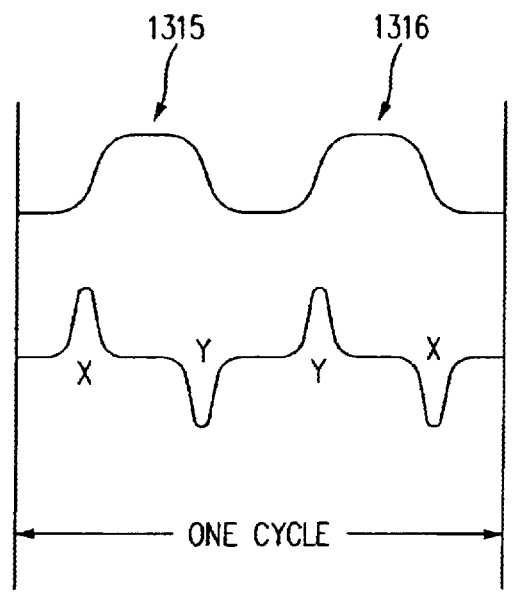
Figure 13F:
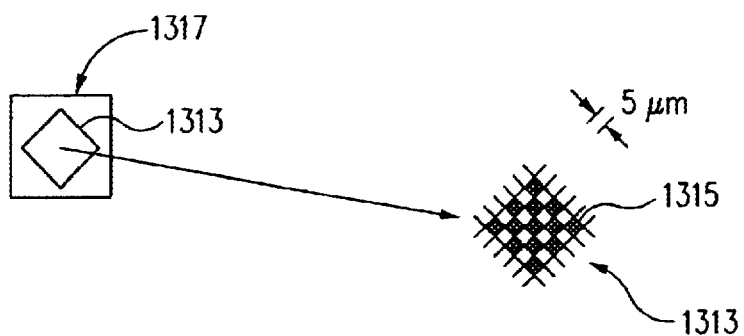
Figure 13G:
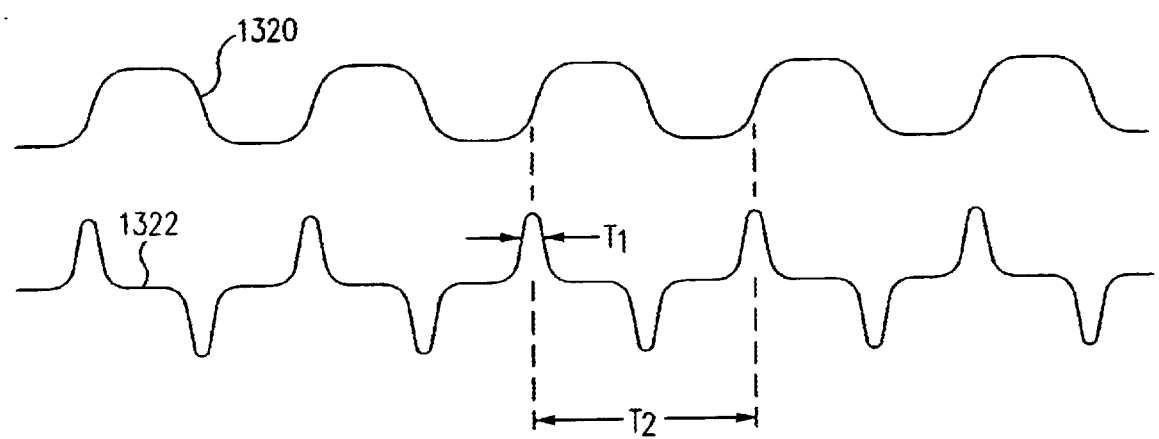

The foregoing arrangement generates a profile in a single direction. FIGS. 13D–13H illustrate an alternative arrangement which provides a two-dimensional profile. Knife-edge plate 1310 includes a rectangular opaque portion 1311 that is oriented at a 45° angle with respect to the oscillating motion of plate 1310. As opaque portion 1311 passes under the spot 1304, the waveforms shown in FIG. 13E are generated, with successive waveforms 1315 and 1316 representing the profile of spot 1304 along perpendicular axes. To make it easier to align the knife edges with the spot, a plate 1317 (measuring, e.g., 0.15"×0.15"×0.60") shown in FIG. 13F contains a number of rectangular opaque areas 1315 which are grouped into a checkerboard pattern 1313. In one embodiment, each opaque area measures 5 $\mu$m×5 $\mu$m and the checkerboard pattern 1313 measures 0.075"×0.075". With this arrangement, an interferometer is not required to calibrate the knife-edge motion (as in the SpotScan™ profiler) because, as shown in FIG. 13G, the checkerboard pattern 1313 generates a series of profiles, plot 1320 being the differential of plot 1322. Since the time $T_2$ represents, for example, 5.0 $\mu$m of motion the spot size is equal to:

$$SpotSize = \left(\frac{T_1}{T_2}\right)5.0 \; \mu m$$

Figure 13H:
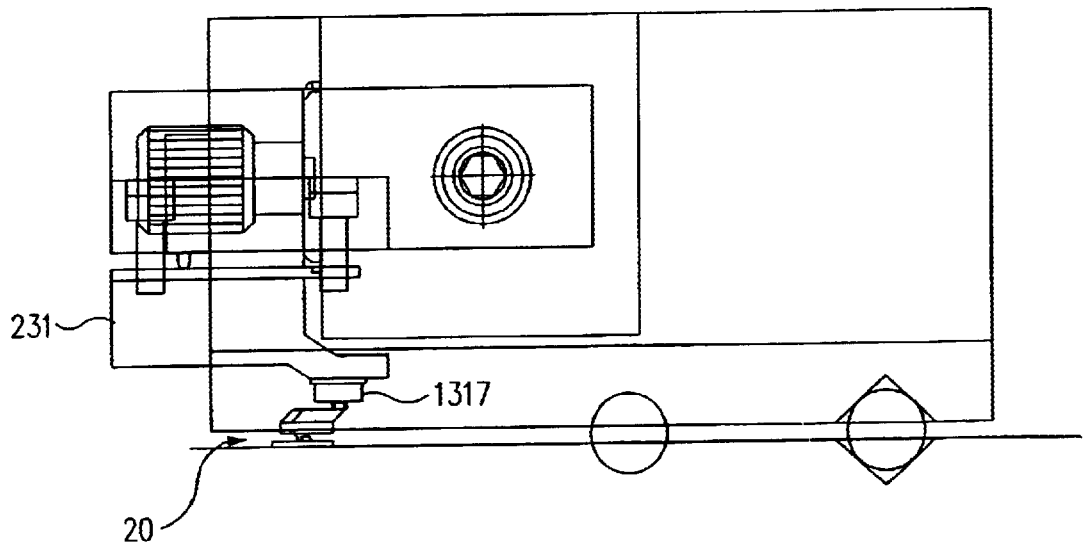
Figure 13I:
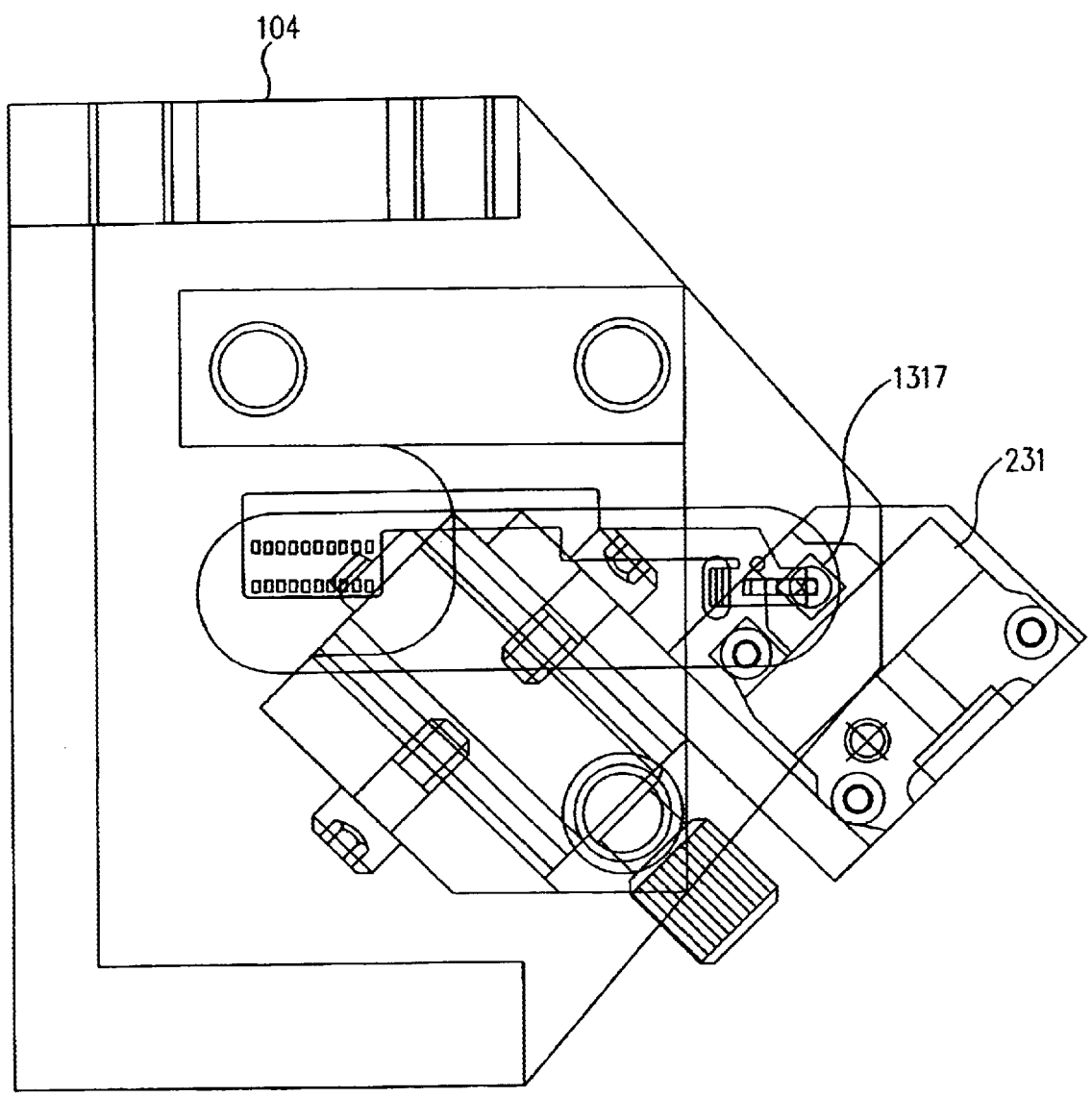

FIGS. 13H and 13I illustrate the mounting of the actuator 231 and knife-edge plate 1312 on the cradle 104.

7. The assembly and characterization of optical head 20 having been completed, the optical head and media actuator 231 are removed from cradle 104. If desired, the wavefront from optical head 20 can be measured on an interferometer (e.g., a Sextant Labs interferometer).

Figure 14A:
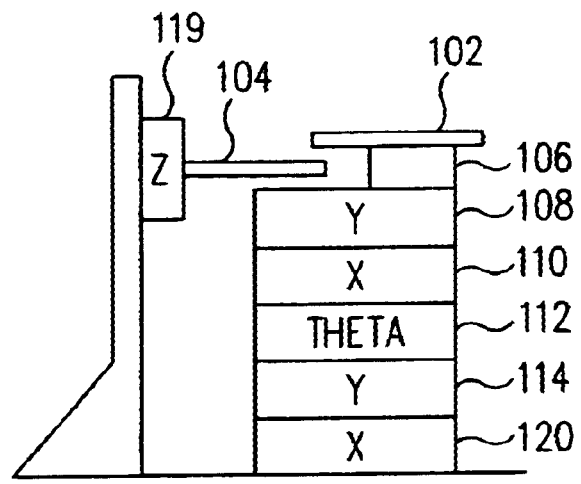
FIGS. 14A and 14B illustrate several additional embodiments according to the invention.
Figure 14B:
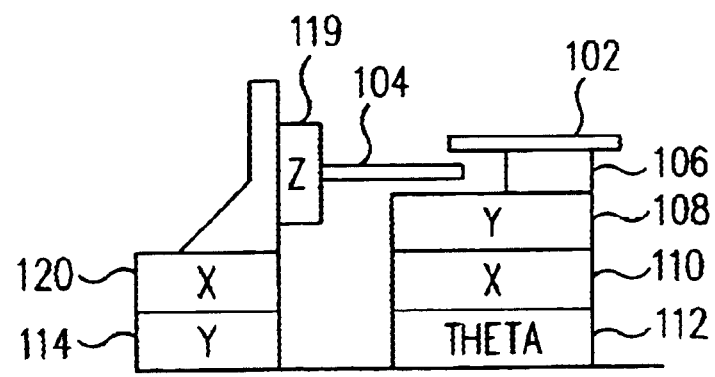

Referring again to FIG. 1, it is apparent from the above description that there are two mechanical paths extending from opposite sides of rotational stage 112. The first mechanical path includes X-translation stage 110 and Y-translation stage 108 and extends to a first holding device (gripper 102). The second mechanical path includes Y-translation stage 114 and X-translation stage 120 and extends to a second holding device (cradle 104). In other embodiments, the locations of the translation stages could be changed. For example, rotational stage 112 could be mounted on both Y-translation stage 114 and X-translation stage 120 (FIG. 14A); or rotational stage 112 could be mounted directly on platform 116, and cradle 104 could be mounted on both Y-translation stage 114 and X-translation stage 120 (FIG. 14B). In both cases, X-translation stage 110 and Y-translation stage 108 remain mounted on rotational stage 112. In these embodiments, there is a single mechanical path extending between the first and second holding devices, the mechanical path containing a rotational stage, first and second X-translation stages and first and second Y-translation stages.

As the foregoing demonstrates, the embodiments described herein are illustrative only and not limiting. Many additional embodiments according to the broad principles of this invention will apparent to those of skill in the art.

I claim:

1. A system for aligning a first and a second component of an optical head, wherein the first component includes a lens and the second component includes a photodetector array, the system comprising:
   a rotational stage;
   a first mechanical path extending from a first side of the rotational stage to an end of the first mechanical path, the first mechanical path comprising a first X-translation stage and a first Y-translation stage;
   a first holding mechanism attached to the end of the first mechanical path for holding the first component of the optical head;
   a second mechanical path extending from a second side of the rotational stage to an end of the second mechanical path, the second mechanical path comprising a second X-translation stage and a second Y-translation stage, wherein the rotational stage may rotate the first mechanical path with respect to the second mechanical path;
   a second holding mechanism attached to the end of the second mechanical path for holding the second component of the optical head;
   a Z-translation stage positioned so as to alter the spacing between the first and second holding mechanisms in a Z direction,
   a first microscope for viewing the first and second components of the optical head in the Z direction; and
   a second microscope for viewing the first and second components of the optical head in a direction perpendicular to the Z direction.

2. The system of claim 1 wherein the first mechanical path comprises a stack comprising the first X-translation stage and the first Y-translation stage.

3. The system of claim 1 wherein the rotational stage is mounted on the second Y-translation stage and the second Y-translation stage is mounted on a base member.

4. The system of claim 1 wherein one of the first and second holding mechanisms comprises a vacuum clamp.

5. The system of claim 1 wherein one of the first and second holding mechanisms comprises a gripper comprising a first jaw and a second jaw connected together at a pivot point, the first jaw comprising a first straight edge, and second jaw comprising second and third straight edges, the straight edges between positioned on the jaws such that the first straight edge is located between the second and third straight edges when the jaws are closed.

6. The, system of claim 1 comprising an actuator for holding a piece of optical media, the actuator being capable of oscillating in at one of a direction perpendicular to a surface of the optical media or a direction parallel to the surface of the optical media.

7. The system of claim 1 wherein the first microscope comprises a first video camera and the second microscope comprises a second video camera.

8. The system of claim 3 wherein the second X-translation stage is mounted on the base member.

9. The system of claim 5 wherein the gripper comprises a spring which urges the first and second jaws in the direction of a closed condition.

10. The system of claim 6 comprising an analog circuit for electrical connection to a component of an optical head held by one of the first and second holding mechanisms.

11. The system of claim 7 comprising at least one video display responsive to output signals from the first and second video cameras.

12. The system of claim 8 wherein the Z-translation stage is mounted on the second X-translation stage.

13. The system of claim 10 comprising an oscilloscope electrically connected to the analog circuit.

14. The system of claim 11 comprising a frame grabber electrically connected in a circuit extending from the first and second video cameras to the video display.

15. The system of claim 12 wherein the second holding mechanism is attached to the Z-translation stage.

16. A method of assembling first and second components of an optical head comprising:
   providing a system including:
      a first holding device;
      a second holding device;
      a mechanical path extending between the first and second holding devices, the mechanical path comprising:
         a rotational stage;
         a first X-translation stage and a first Y-translation stage;
         a second X-translation stage and a second Y-translation stage; and
         a Z-translation stage positioned so as to alter the spacing between the first and second holding mechanisms in a Z direction;
   placing the first component of the head in the first holding device, the first component comprising a light source;
   activating the light source;
   adjusting the first X-translation stage and the first Y-translation stage to align a beam from the light source with a center of rotation of the rotational stage;

placing the second component of the head in the second holding device;

measuring an offset of the second component, the offset being a distance between a point where the light beam enters the second component and a point where the light beam exits the second component, the distance being measured in a direction perpendicular to the light beam as it enters the second component;

viewing the first component through a microscope;

centering cross-hairs of a microscope on the center of rotation;

moving the microscope the offset distance;

adjusting the position of the second component until the light beam is aligned with the cross-hairs; and rotating the first component until the light beam is incident at a desired position on the first component.

* * * * *